United States Patent
Uchino et al.

(10) Patent No.: US 9,622,126 B2
(45) Date of Patent: Apr. 11, 2017

(54) MOBILE STATION AND CONTROL METHOD

(71) Applicant: NTT DOCOMO, INC., Tokyo (JP)

(72) Inventors: Tooru Uchino, Tokyo (JP); Hideaki Takahashi, Tokyo (JP); Yuta Sagae, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/443,737

(22) PCT Filed: Nov. 21, 2013

(86) PCT No.: PCT/JP2013/081351
§ 371 (c)(1),
(2) Date: May 19, 2015

(87) PCT Pub. No.: WO2014/084111
PCT Pub. Date: Jun. 5, 2014

(65) Prior Publication Data
US 2015/0304915 A1 Oct. 22, 2015

(30) Foreign Application Priority Data

Nov. 30, 2012 (JP) ................................. 2012-262579

(51) Int. Cl.
*H04W 4/00* (2009.01)
*H04W 36/04* (2009.01)
(Continued)

(52) U.S. Cl.
CPC ........... *H04W 36/04* (2013.01); *H04W 72/04* (2013.01); *H04W 72/0406* (2013.01);
(Continued)

(58) Field of Classification Search
None
See application file for complete search history.

(56) References Cited

U.S. PATENT DOCUMENTS

2011/0134774 A1* 6/2011 Pelletier .............. H04W 52/365
370/252
2012/0207089 A1* 8/2012 Kone ...................... H04L 5/001
370/328
(Continued)

FOREIGN PATENT DOCUMENTS

WO 2012/146305 A1 11/2012

OTHER PUBLICATIONS

Extended European Search Report in counterpart European Patent Application No. 138577523, dated Nov. 20, 2015 (9 pages).
(Continued)

*Primary Examiner* — Anh-Vu Ly
(74) *Attorney, Agent, or Firm* — Osha Liang LLP

(57) ABSTRACT

A mobile station for communication using carrier aggregation includes a secondary cell state management unit configured to manage whether a state of a secondary cell is an activation state or a deactivation state; and a transmission control unit configured to stop transmission of uplink control information on a physical uplink control channel in a first secondary cell, when the state of the first secondary cell managed by the secondary cell state management unit is the deactivation state at a timing of transmission of the physical uplink control channel in the first secondary cell.

9 Claims, 15 Drawing Sheets

(51) Int. Cl.
H04W 72/04 (2009.01)
H04W 76/06 (2009.01)
H04W 84/04 (2009.01)
H04L 5/00 (2006.01)

(52) U.S. Cl.
CPC ..... *H04W 72/0453* (2013.01); *H04W 76/066* (2013.01); *H04L 5/0098* (2013.01); *H04W 84/042* (2013.01)

(56) References Cited

U.S. PATENT DOCUMENTS

| | | | | |
|---|---|---|---|---|
| 2012/0281548 | A1* | 11/2012 | Lin | H04W 36/30 370/242 |
| 2014/0023054 | A1* | 1/2014 | Yang | H04W 56/0045 370/336 |
| 2014/0050113 | A1* | 2/2014 | Rosa | H04W 52/0229 370/252 |
| 2014/0140309 | A1* | 5/2014 | Lee | H04W 52/0216 370/329 |
| 2014/0194126 | A1* | 7/2014 | Tsuboi | H04W 36/0072 455/437 |
| 2014/0301348 | A1* | 10/2014 | Chmiel | H04W 72/042 370/329 |

OTHER PUBLICATIONS

Catt, "Timing of SCell Activation/Deactivation"; 3GPP TSG-RAN WG2 Meeting #73, R2-111167; Taipei, Taiwan; Feb. 24-25, 2011 (2 pages).
ETRI; "UL SCell Deactivation Timing"; 3GPP TSG RAN WG2 #71 bis, R2-105745; Xi'an, China; Oct. 11-15, 2010 (2 pages).
Extended European Search Report in counterpart European Patent Application No. 13857752.3, dated Mar. 8, 2016 (13 pages).
International Search Report in corresponding PCT Application No. PCT/JP2013/081351 mailed Feb. 18, 2014 (5 pages).
Written Opinion issued in corresponding PCT Application No. PCT/JP2013/081351 mailed Feb. 18, 2014 (4 pages).
3GPP TS 36.300 V11.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," section 7.5; Sep. 2012 (205 pages).
Office Action issued in corresponding Japanese Application No. 2012-262579, mailed Jan. 4, 2017 (7 pages).

* cited by examiner

MOBILE STATION AND CONTROL METHOD

TECHNICAL FIELD

The present invention relates to a mobile station and a control method.

BACKGROUND ART

The standardization of LTE-A (Long Term Evolution-Advanced) is currently under discussion in 3GPP (3rd Generation Partnership Project) as a next generation communication standard for LTE (Long Term Evolution). A carrier aggregation (CA) technology is introduced in an LTE-A system to maintain backward compatibility with an LTE system and to achieve higher throughput than the LTE system. According to the carrier aggregation technology, an LTE carrier (also referred to as a "component carrier") having a maximum bandwidth of 20 MHz, which is supported by the LTE system, is used as a basic component. Then, a plurality of component carriers are simultaneously used, thereby achieving broader bandwidth communication.

According to the carrier aggregation, an arrangement of component carriers as shown in FIG. 1 is assumed. In Case 1, two adjacent 20 MHz bandwidths can be used as a 40 MHz bandwidth according to the carrier aggregation. Case 1 can be effectively used when a continuous bandwidth broader than 20 MHz is provided, for example, and can maintain backward compatibility with an LTE system and achieve higher throughput than the LTE system. In case 2, two separate 10 MHz bandwidth can be used as a 20 MHz bandwidth according to the carrier aggregation. Case 2 can be effectively used when frequency allocation to an operator is discontiguous, for example, and can maintain backward compatibility with an LTE system and achieve higher throughput than the LTE system.

According to the carrier aggregation, a mobile station (UE: User Equipment) can communicate with a base station (eNB: evolved Node B), simultaneously using a plurality of component carriers. In the carrier aggregation, a primary cell (PCell: Primary Cell) and a secondary cell (SCell: Secondary Cell) are configured. The primary cell is reliable and used to maintain connectivity with a mobile station. The secondary cell is additionally configured for a mobile station connecting the primary cell. For example, in the cases shown in FIG. 1, one of the two component carriers may be configured as a primary cell and the other may be configured as a secondary cell (see 3GPP TS 36.300 V11.3.0 (2012-09), section 7.5).

A primary cell is a cell configured in a similar manner to an LTE system and a cell to maintain connectivity between a mobile station and a network. Thus, a mobile station can receive a PDCCH (Physical Downlink Control Channel) and a PDSCH (Physical Downlink Shared Channel) and transmit a PUCCH (Physical Uplink Control Channel), a PUSCH (Physical Uplink Shared Channel), and a PRACH (Physical Random Access Channel) in a primary cell. When a primary cell is changed, a mobile station needs to perform handover.

On the other hand, a secondary cell is a cell which is configured for a mobile station in addition to the primary cell. An addition and a removal of a secondary cell are performed using an RRC (Radio Resource Control) configuration. A mobile station does not transmit a PUCCH and a PRACH in a secondary cell. A secondary cell is in a deactivation state, immediately after the secondary cell is configured for a mobile station. Communication or scheduling in the secondary cell is possible only after the secondary cell is activated in a MAC (Medium Access Control) layer. Thus, in order to allow communication in the secondary cell, in other words, in order to allow scheduling in the secondary cell, the secondary cell needs to be transitioned to an activation state.

In an LTE-A system currently under discussion, in order to transition a secondary cell to the activation state or the deactivation state, a base station transmits a MAC CE (control element) in the MAC layer to a mobile station to instruct the mobile station to activate/deactivate the configured secondary cell, as shown in FIG. 2. When the mobile station receive the explicit instruction of the state transition, the mobile station transitions the secondary cell to the instructed state.

In addition, when the mobile station receives from the base station a MAC CE for activating the secondary cell, the mobile station activates the secondary cell and starts an SCell Deactivation Timer to transition the secondary cell to the deactivation state after a predetermined time period. The base station also starts an SCell Deactivation Timer when the base station transmits the MAC CE or when the base station receives an acknowledgement (ACK) from the mobile station. In other words, each of the base station and the mobile station maintains its own SCell Deactivation Timer and manages the state of the activated secondary cell. After the SCell Deactivation Timer is started, when the base station performs scheduling of new radio resources for the mobile station in the secondary cell, each of the base station and the mobile station restarts its own SCell Deactivation Time. Then, when the SCell Deactivation Timer expires or when the mobile station receives an explicit instruction of the state transition to deactivate the secondary cell, the mobile station transitions the secondary cell to the deactivation state. Also, when the SCell Deactivation Timer for the secondary cell expires or when the base station receives a notification from the mobile station that the secondary cell is deactivated, the base station determines that the secondary cell is deactivated and stops scheduling of radio resources for the mobile station in the secondary cell. In this manner, consistency of the activation/deactivation state of the secondary cell is maintained between the base station and the mobile station.

DISCLOSURE OF INVENTION

Problem(s) to be Solved by the Invention

As mentioned above, transmission of a PUCCH is supported only in a primary cell. In other words, UCI (uplink control information) such as an ACK/NACK (acknowledgement/negative acknowledgement), a SR (scheduling request), and a CQI (channel quality indicator) is transmitted on the PUCCH in the primary cell.

When transmission of the PUCCH is supported only in the primary cell, however, there may be a shortage of PUCCH resources with an increase in the number of mobile stations which use a particular cell as a primary cell. For example, when a base station is deployed covering a small cell such as a pica cell or a femto cell which is overlaid on a macro cell and mobility management of mobile stations is provided in the macro cell, there may be a shortage of PUCCH resources in the macro cell. For example, when a macro cell is configured as a primary cell to schedule voice traffic in the macro cell, there may be a shortage of PUCCH resources in the macro cell.

To address the shortage of PUCCH resources, it is possible to limit the number of mobile stations for each cell which can connect to a primary cell. In other words, mobile stations in excess of a predetermined number can use another cell as a primary cell. However, since handover procedures are needed to change a primary cell, the use of another cell as a primary cell is not preferable from the viewpoint of control workloads or user throughput. Accordingly, transmission of the PUCCH is also desired in a secondary cell.

In addition, it is expected that carrier aggregation using component carriers which belong to different base stations will be adopted. This type of carrier aggregation is referred to as "Inter-site CA". According to Inter-site CA, uplink control information to be transmitted on a PUCCH should be transmitted to a base station which performs downlink transmission. Accordingly, transmission of the PUCCH is also desired in a secondary cell.

When transmission of the PUCCH is supported in a secondary cell, there is a problem in that the PUCCH in the secondary cell is not appropriately handled when inconsistency of the activation/deactivation state of the secondary cell between a base station and a mobile station occurs.

For example, as shown in FIG. 3, when a MAC CE transmitted from a base station to activate the configured secondary cell is not successfully received by a mobile station and the base station erroneously determines that ACK is received in response to the transmitted MAC CE due to noise, interference, or the like (NACK to ACK error), the mobile station keeps the secondary cell in the deactivation state, but the base station understands that the secondary cell is transitioned to the activation state. In this manner, there is inconsistency of the activation/deactivation state of the secondary cell between the base station and the mobile station. The inconsistency of the activation/deactivation state also occurs because of misalignment of the SCell Deactivation Timer.

When the mobile station keeps the secondary cell in the deactivation state but the base station understands that the secondary cell is in the activation state, the base station cannot obtain uplink control information to be transmitted on the PUCCH in the secondary cell.

It is a general object of the present invention to provide a solution for a mobile station and a base station to handle the PUCCH in the secondary cell, even if the mobile station keeps the secondary cell in the deactivation state but the base station understands that the secondary cell is in the activation state.

Means for Solving the Problem(s)

In one aspect of the present invention, there is provided a mobile station for communication using carrier aggregation, including:

a secondary cell state management unit configured to manage whether a state of a secondary cell is an activation state or a deactivation state; and a transmission control unit configured to stop transmission of uplink control information on a physical uplink control channel in a first secondary cell, when the state of the first secondary cell managed by the secondary cell state management unit is the deactivation state at a timing of transmission of the physical uplink control channel in the first secondary cell.

In another aspect of the present invention, there is provided a control method in a mobile station for communication using carrier aggregation, including the steps of:

managing, by a secondary cell state management unit, whether a state of a secondary cell is an activation state or a deactivation state; and stopping transmission of uplink control information on a physical uplink control channel in a first secondary cell, when the state of the first secondary cell managed by the secondary cell state management unit is the deactivation state at a timing of transmission of the physical uplink control channel in the first secondary cell.

In another aspect of the present invention, there is provided a mobile station for communication using carrier aggregation, including:

a secondary cell state management unit configured to manage whether a state of a secondary cell is an activation state or a deactivation state;

a state inconsistency detection unit configured to detect inconsistency of a state where the state of the secondary cell managed by the secondary cell state management unit is the deactivation state and a state of the secondary cell managed by a base station is the activation state; and a transmission unit configured to transmit a notification to the base station that the state of the secondary cell is the deactivation state, when the inconsistency of the state of the secondary cell is detected by the state inconsistency detection unit.

In another aspect of the present invention, there is provided a control method in a mobile station for communication using carrier aggregation, including the step of:

managing, by a secondary cell state management unit, whether a state of a secondary cell is an activation state or a deactivation state;

detecting inconsistency of a state where the state of the secondary cell managed by the secondary cell state management unit is the deactivation state and a state of the secondary cell managed by a base station is the activation state; and transmitting a notification to the base station that the state of the secondary cell is the deactivation state, when the inconsistency of the state of the secondary cell is detected.

In another aspect of the present invention, there is provided a mobile station for communication using carrier aggregation, including:

a reception unit configured to receive an instruction from a base station to transition a secondary cell to a deactivation state; and a transition instruction control unit configured to discard the instruction received by the reception unit, when the instruction received by the reception unit is an instruction for a secondary cell in which transmission of a physical uplink control channel is supported.

In another aspect of the present invention, there is provided a control method in a mobile station for communication using carrier aggregation, including the steps of:

receiving an instruction from a base station to transition a secondary cell to a deactivation state; and discarding the received instruction, when the received instruction is an instruction for a secondary cell in which transmission of a physical uplink control channel is supported.

Advantageous Effect of the Invention

According to the present invention, it is possible for a mobile station and a base station to handle the PUCCH in the secondary cell, even if the mobile station keeps the secondary cell in the deactivation state but the base station understands that the secondary cell is in the activation state.

DETAILED DESCRIPTION OF THE PREFERRED EMBODIMENTS

Figure 1:
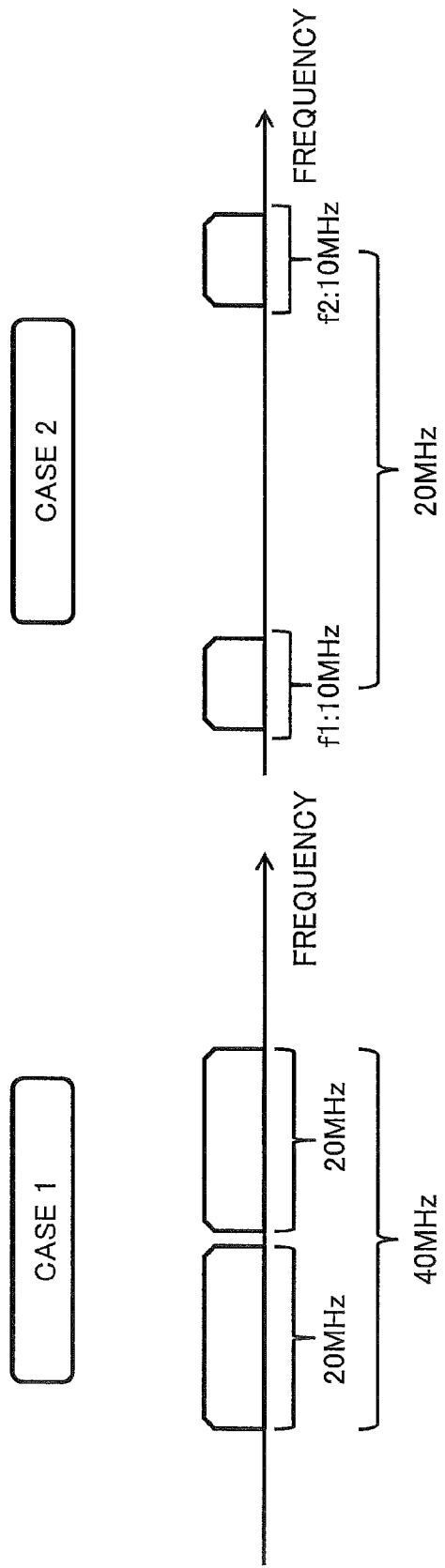
FIG. 1 shows a conceptual diagram of carrier aggregation.
Figure 2:
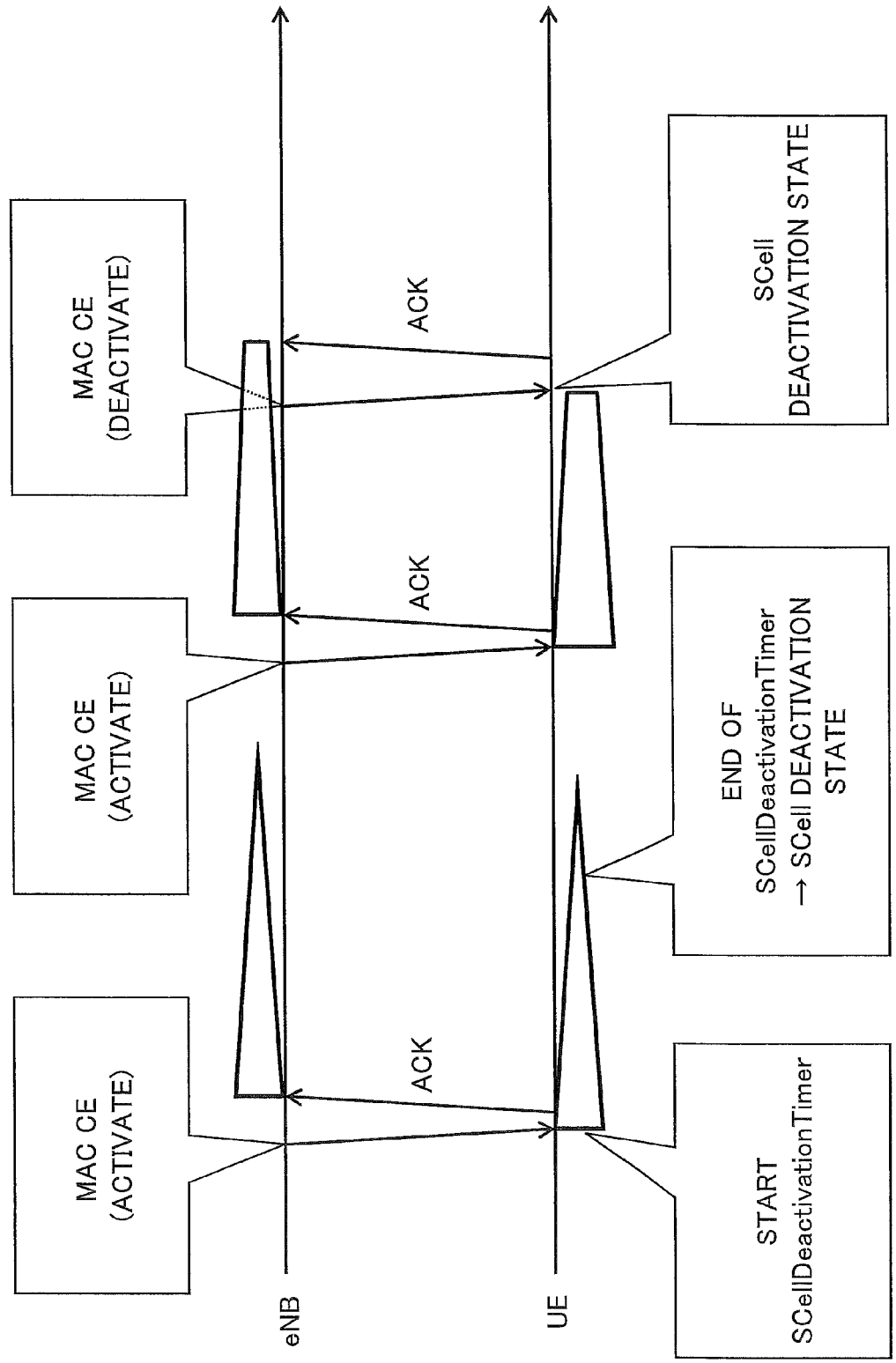
FIG. 2 shows a conceptual diagram of transition of an activation/deactivation state of a secondary cell.
Figure 3:
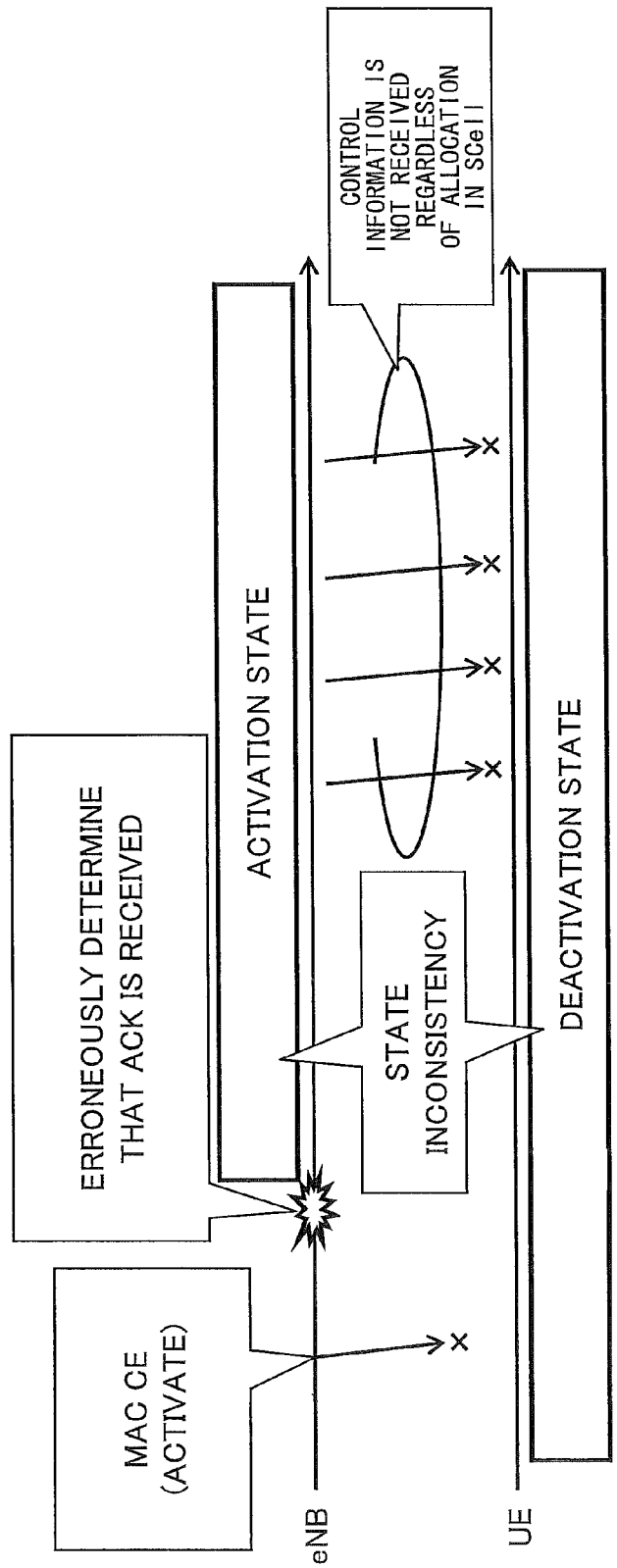
FIG. 3 shows a conceptual diagram of inconsistency of an activation/deactivation state of a secondary cell.

An embodiment of the present invention is described below with reference to the accompanying drawings.

In an embodiment of the present invention, a mobile station and a base station for communication using carrier aggregation are described below in a radio communication system such as an LTE-A (Long Term Evolution-Advanced) system. In the carrier aggregation, a primary cell for maintaining connectivity between a base station (eNB: evolved Node B) and a mobile station (UE: User Equipment) and a secondary cell which is additionally configured for the mobile station connecting the primary cell are used. It is assumed that transmission of a POOCH is supported not only in the primary cell but also in the secondary cell. In other words, it is assumed that a mobile station can transmit UCI (uplink control information) such as an ACK/NACK (acknowledgement/negative acknowledgement), a SR (scheduling request), and a CQI (channel quality indicator) on the PUCCH in the primary cell as well as on the PUCCH on the secondary cell. It should be noted that transmission of the PUCCH is supported in all the secondary cells or in part of the secondary cells.

Assuming that transmission of the PUCCH is supported in the secondary cell, the PUCCH in the secondary cell is not appropriately handled when inconsistency of the activation/deactivation state of the secondary cell between a base station and a mobile station occurs. For example, when the mobile station keeps the secondary cell in the deactivation state but the base station understands that the secondary cell is in the activation state, the base station cannot obtain uplink control information to be transmitted on the PUCCH in the secondary cell, and thus cannot appropriately perform scheduling.

In this case, transmission of the PUCCH in the secondary cell is controlled by using one of the following approaches according to an embodiment of the present invention.

(1) An Approach to Transmit the PUCCH in Another Cell in which Transmission of the PUCCH is Supported When the state of a secondary cell is the deactivation state at a timing of transmission of the PUCCH in the secondary cell, a mobile station stops transmission of uplink control information on the PUCCH in the secondary cell. Instead, the mobile station transmits, in another cell in which transmission of the PUCCH is supported, the uplink control information to be transmitted on the PUCCH in the secondary cell.

(2) An Approach to Stop Transmission of the PUCCH in a Deactivated Secondary Cell When the state of a secondary cell is the deactivation state at a timing of transmission of the PUCCH in the secondary cell, a mobile station stops transmission of uplink control information on the PUCCH in the secondary cell. When a resource for a PUSCH is allocated at the timing of transmission of the PUCCH, the mobile station may transmit the uplink control information to be transmitted on the PUCCH in the secondary cell using the PUSCH.

(3) An Approach to Provide a Notification to a Base Station that the State of a Secondary Cell in which Transmission of the PUCCH is Supported is the Deactivation State When a mobile station determines inconsistency of the activation/deactivation state of a secondary cell in which transmission of the PUCCH is supported between the mobile station and a base station, the mobile station transmits a notification to the base station that the state of the secondary cell is the deactivation state.

(4) An Approach not to Transition a Secondary Cell in which Transmission of the PUCCH is Supported to the Deactivation State As to a secondary cell in which transmission of the PUCCH is supported, a mobile station discards an instruction to transition the secondary cell to the deactivation state, even if the mobile station receives the instruction from a base station. In addition, the mobile station does not transition the secondary cell to the deactivation state, even if a SCell Deactivation Timer for transitioning the secondary cell to the deactivation state after a predetermined period of time expires.

Each of these approaches is described below.

(1) An Approach to Transmit the PUCCH in Another Cell in which Transmission of the PUCCH is Supported <Configurations and Operations of a Mobile Station>

Figure 4:
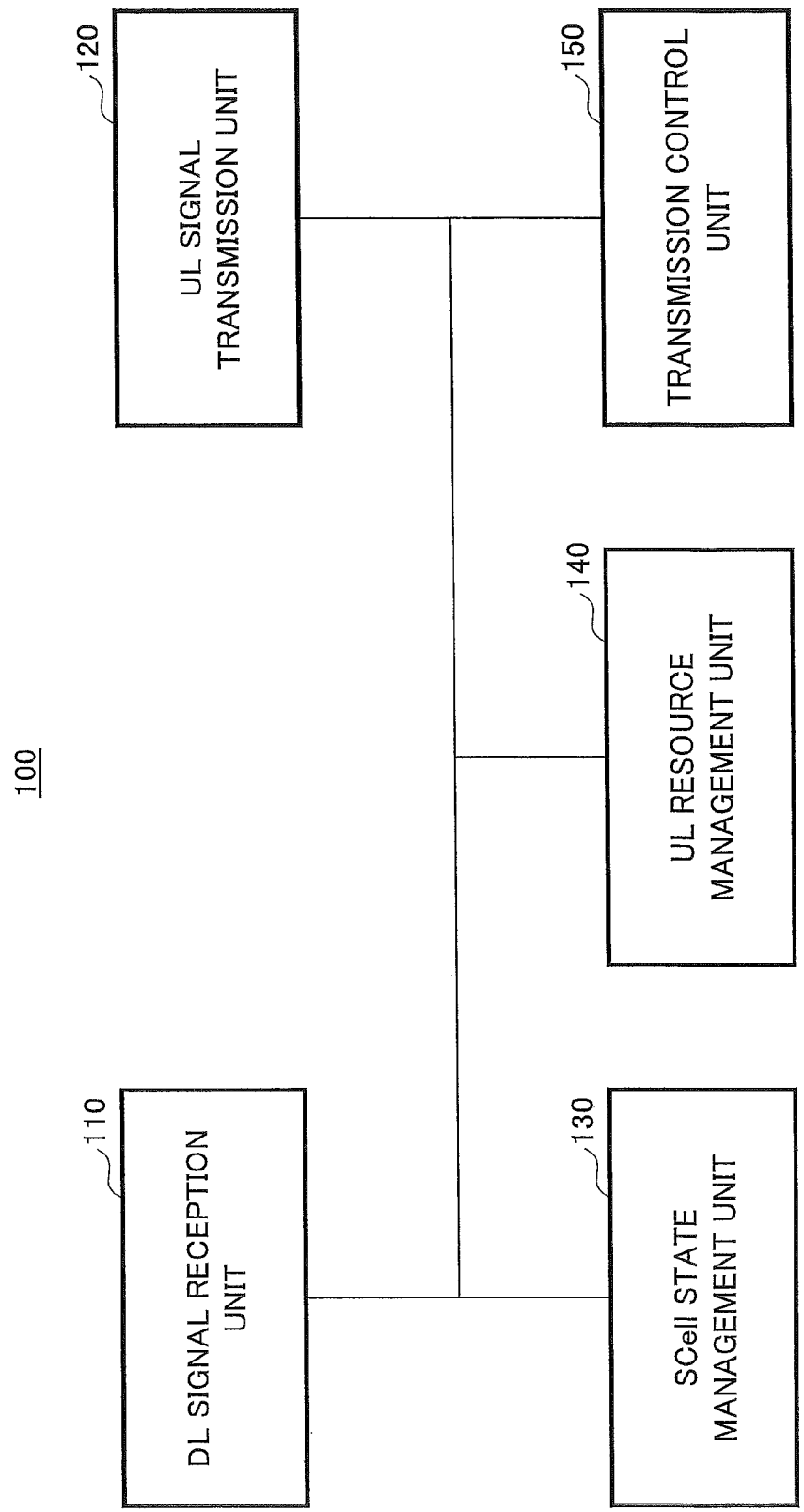
FIG. 4 shows a block diagram of a mobile station in accordance with an embodiment of the present invention.

FIG. 4 shows a configuration of a mobile station 100 in accordance in an embodiment of the present invention. The mobile station 100 may be any suitable apparatus including radio communication capabilities such as a cellular phone or a smart phone.

The mobile station 100 includes a downlink (DL) signal reception unit 110, an uplink (UL) signal transmission unit 120, a secondary cell (SCell) state management unit 130, an uplink (UL) resource management unit 140, and a transmission control unit 150.

The DL signal reception unit 110 receives radio signals including data and/or control information from a base station via a primary cell and/or a secondary cell. In connection with PUCCH transmission, the DL signal reception unit 110 receives control information indicating a PUCCH resource from the base station. In this approach, the base station reserves a PUCCH resource such that uplink control information to be transmitted on the PUCCH can be received in a cell other than the secondary cell, in preparation for inconsistency of the activation/deactivation state of the secondary cell. For example, when transmission of the PUCCH is supported in the primary cell and two activated secondary cells, the base station may reserve PUCCH resources for the two secondary cells in the primary cell or reserve PUCCH resources for the two secondary cells in each of the secondary cells. Alternatively, the base station may reserve PUCCH resources for the two secondary cells in a secondary cell with a larger or smaller index. The secondary cell index is a value specified by the base station together with a secondary cell ID when the secondary cell is added (configured). Alternatively, the base station may reserve PUCCH resources for the two secondary cells in a cell with the best quality. The cell with the best quality is a cell with the best quality among the primary cell and the secondary cells in which transmission of the PUCCH is supported. When the DL signal reception unit 110 receives control information indicating the reserved PUCCH resource, the mobile station 100 identifies cells in which uplink control information is to be transmitted.

The UL signal transmission unit 120 transmits radio signals including data and/or control information to a base station via a primary cell and/or a secondary cell. In connection with PUCCH transmission, the UL signal transmission unit 120 transmits UCI (uplink control information) such as an ACK/NACK, a SR, or a CQI using the PUCCH resource specified by the base station.

The SCell state management unit 130 manages whether the state of a secondary cell is an activation state or a deactivation state. Immediately after a secondary cell is added (configured) by means of an RRC configuration, the secondary cell is in the deactivation state. In order to transition the configured secondary cell to a state where communication or scheduling is possible, it is needed to transition the secondary cell to the activation state. For example, in the LTE-A system, in order to transition the secondary cell to the activation or deactivation state, the base station transmits a MAC CE in the MAC layer to the mobile station 100 to transition the secondary cell to the activation/deactivation state. The Scell state management unit 130 transitions the state of the secondary cell upon receiving the instruction of the state transition from the base station.

When the SCell state management unit 130 receives the MAC CE to activate the secondary cell, the SCell state management unit 130 starts a SCell Deactivation Timer to transition the secondary cell to the deactivation state upon the expiry of the timer. After the SCell Deactivation Timer is started, when the base station performs scheduling of a new radio resource in the secondary cell, the SCell state management unit 130 resets and restarts the SCell Deactivation Timer. Then, when the SCell Deactivation Timer expires or when an explicit instruction of the state transition to deactivate the secondary cell is transmitted from the base station to the mobile station 100, the SCell state management unit 130 transitions the secondary cell to the deactivation state.

The UL resource management unit 140 manages uplink radio resources. In this approach, when the DL signal reception unit 110 receives control information indicating a PUCCH resource, the UL resource management unit 140 provides the PUCCH resource specified by the base station to the UL signal transmission unit 120 and the transmission control unit 150.

The transmission control unit 150 controls transmission of radio signals from the UL signal transmission unit 120. In connection with PUCCH transmission, the transmission control unit 150 checks the state of the secondary cell managed by the SCell state management unit 130 at a timing of PUCCH transmission in the secondary cell. When the state of the secondary cell is the deactivation state, the transmission control unit 150 stops transmission of uplink control information on the PUCCH in the secondary cell. As described above, the base station reserves a PUCCH resource such that uplink control information to be transmitted on the PUCCH can be received in a cell other than the secondary cell. Accordingly, the transmission control unit 150 can control transmission of the uplink control information such that the uplink control information to be transmitted on the PUCCH in the deactivated secondary cell is transmitted using the PUCCH in the primary cell or a PUCCH in another activated secondary cell.

The transmission control unit 150 may select a cell in which uplink control information to be transmitted on the PUCCH in the deactivated secondary cell is transmitted based on a secondary cell index or cell quality. For example, the uplink control information to be transmitted on the PUCCH in the deactivated secondary cell may be transmitted in the primary cell. Alternatively, the uplink control information to be transmitted on the PUCCH in the deactivated secondary cell may be transmitted in an activated secondary cell in which transmission of the PUCCH is supported. When there are a plurality of activated secondary cells in which transmission of the PUCCH is supported, the uplink control information may be transmitted in a cell with a larger or smaller index. Alternatively, the uplink control information to be transmitted on the PUCCH in the deactivated secondary cell may be transmitted in a cell with the best quality.

Figure 5:
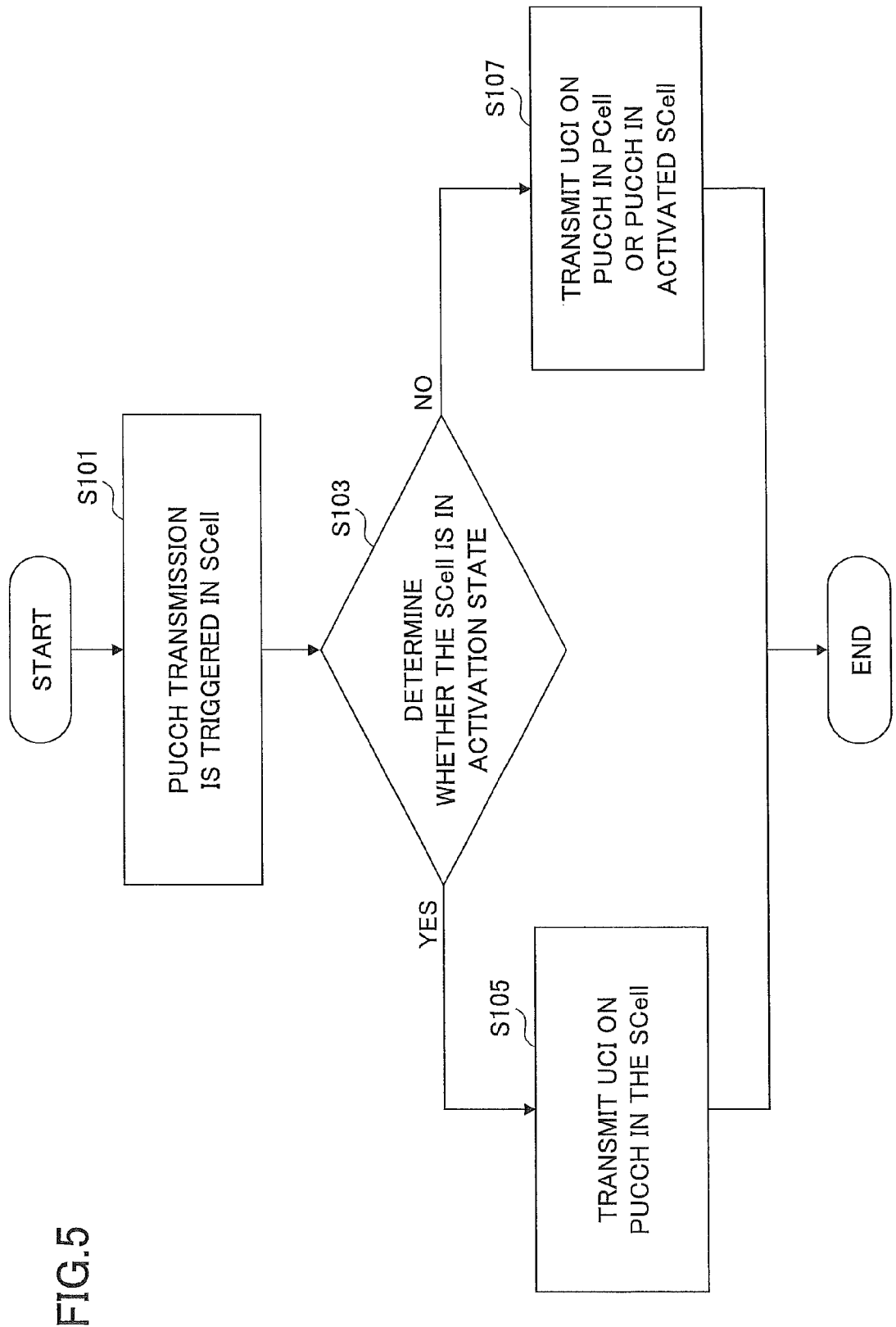
FIG. 5 shows a flowchart of a control method in a mobile station in accordance with an embodiment of the present invention.

FIG. 5 shows a control method in the mobile station 100 in accordance with an embodiment of the present invention.

At step S101, PUCCH transmission in a secondary cell is triggered. In other words, the transmission control unit 150 determines that a timing of PUCCH transmission in the secondary cell arrives.

At step S103, the transmission control unit 150 checks the state of the secondary cell managed by the SCell state management unit 130. When the state of the secondary cell in which uplink control information is to be transmitted on the PUCCH is the activation state (S103: YES), at step S105, the transmission control unit 150 controls transmission such that UCI (uplink control information) such as an ACK/NACK, a SR, or a CQI is transmitted in the secondary cell.

On the other hand, when the state of the secondary cell in which uplink control information is to be transmitted on the PUCCH is the deactivation state (S103: NO), at step S107, the transmission control unit 105 stops transmission of the uplink control information in the secondary cell. Instead, the transmission control unit 150 controls transmission such that UCI (uplink control information) such as an ACK/NACK, a SR, or a CQI is transmitted on the PUCCH in the primary cell or a PUCCH in an activated secondary cell.

<Configurations and Operations of a Base Station>

Figure 6:
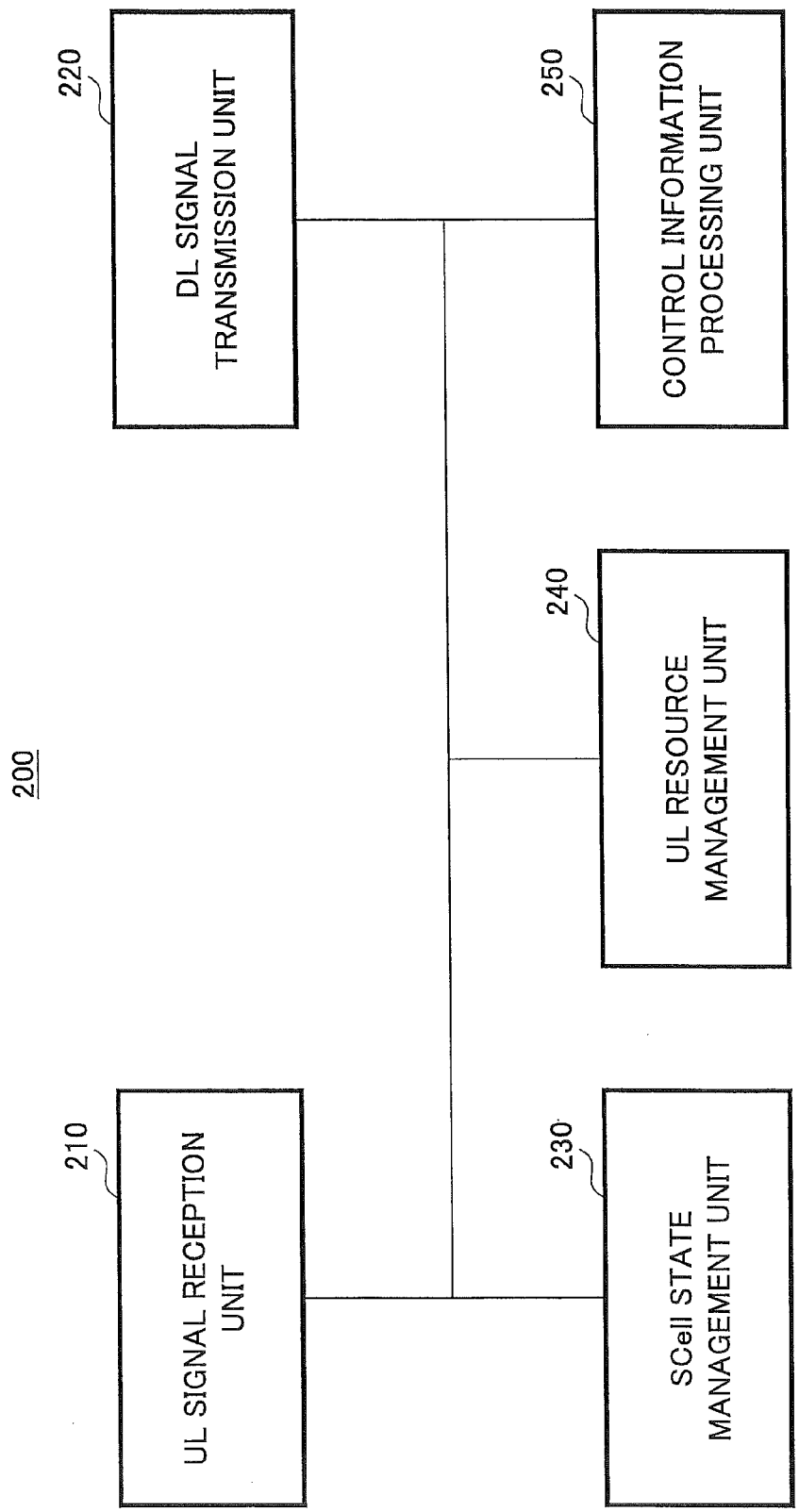
FIG. 6 shows a block diagram of a base station in accordance with an embodiment of the present invention.

FIG. 6 shows a configuration of a base station 200 in accordance with an embodiment of the present invention. The base station 200 wirelessly connects to the mobile station 100 to transmit to the mobile station 100 downlink data received from a switching center or the like and to transmit to the switching center or the like uplink data received from the mobile station 100.

The base station 200 includes an uplink (UL) signal reception unit 210, a downlink (DL) signal transmission unit 220, a secondary cell (SCell) state management unit 230, an uplink (UL) resource management unit 240, and a control information processing unit 250.

The UL signal reception unit 210 receives radio signals including data and/or control information from a mobile station via a primary cell or a secondary cell. In connection with PUCCH reception, the UL signal reception unit 210 receives UCI (uplink control information) such as an ACK/NACK, a SR, or a CQI from the mobile station. In this approach, the base station 200 reserves a PUCCH resource such that uplink control information to be transmitted on the PUCCH can be received in a cell other than the secondary cell, in preparation for inconsistency of the activation/deactivation state of the secondary cell. For this reason, the UL signal reception unit 210 may receive, from a cell other than the secondary cell, uplink control information to be transmitted on the PUCCH in the secondary cell.

The DL signal transmission unit 220 transmits radio signals including data and/or control information to a mobile station via a primary cell and/or a secondary cell. In connection with PUCCH reception, the DL signal transmission unit 220 transmits control information indicating a PUCCH resource. The DL signal transmission unit 220 transmits control information indicating the PUCCH resource which is reserved to receive, from another cell, uplink control information to be transmitted on the PUCCH in the secondary cell.

The SCell state management unit 230 manages whether the state of a secondary cell is the activation state or the deactivation state. As described above, immediately after a secondary cell is added (configured) by means of an RRC configuration, the secondary cell is in the deactivation state. In order to transition the secondary cell to the activation or deactivation state, the base station 200 transmits a MAC CE in the MAC layer to the mobile station to transition the secondary cell to the activation/deactivation state. The SCell state management unit 230 transitions the state of the secondary cell upon receiving an acknowledgement (ACK/NACK) from the mobile station in response to the instruction of transition from the base station 200.

Upon receiving an acknowledgement (ACK) in response to the MAC CE from the mobile station, the SCell state management unit 230 determines that the secondary cell is activated and starts a SCell Deactivation Timer to transition the secondary cell to the deactivation state upon the expiry of the timer. After the SCell Deactivation Timer is started, when the base station 200 performs scheduling of a new radio resource in the secondary cell, the SCell state management unit 230 resets and restarts the SCell Deactivation Timer. Then, when the SCell Deactivation Timer expires or when an acknowledgement (ACK) in response to an explicit instruction of the state transition to deactivate the secondary cell is received, the SCell state management unit 230 transitions the secondary cell to the deactivation state.

When uplink control information of the PUCCH is received in another cell, the SCell state management unit 230 may determine that the state of the secondary cell in the base station 200 is inconsistent with the state of the secondary cell in the mobile station. In this case, the SCell state management unit 230 may set the state of the secondary cell to the deactivation state. Alternatively, the SCell state management unit 230 may allow the mobile station to transition the secondary cell to the activation state by transmitting a MAC CE to the mobile station.

The UL resource management unit 240 manages uplink resources. As described above, the UL resource management unit 240 reserves a PUCCH resource in a secondary cell in which transmission of the PUCCH is supported, and reserves a PUCCH resource for the secondary cell also in the primary cell or another secondary cell in which transmission of the PUCCH is supported. For example, when transmission of the POOCH is supported in the primary cell and two activated secondary cells, the UL resource management unit 240 may reserve PUCCH resources for the two secondary cells in the primary cell or reserve POOCH resources for the two secondary cells in each of the secondary cells. Alternatively, the UL resource management unit 240 may reserve POOCH resources for the two secondary cells in a secondary cell with a larger or smaller index. Alternatively, the UL resource management unit 240 may reserve PUCCH resources for the two secondary cells in a cell with the best quality.

The control information processing unit 250 monitors the PUCCH resource reserved by the UL resource management unit 240 and processes uplink control information of the POOCH in the secondary cell. When the uplink control information of the PUCCH in a secondary cell in which transmission of the PUCCH is supported is received in the secondary cell, the control information processing unit 250 uses the received uplink control information for scheduling or the like. Even if the uplink control information to be transmitted on the POOCH in the secondary cell is received in another cell, the control information processing unit 250 uses the received uplink control information for scheduling or the like.

Figure 7:
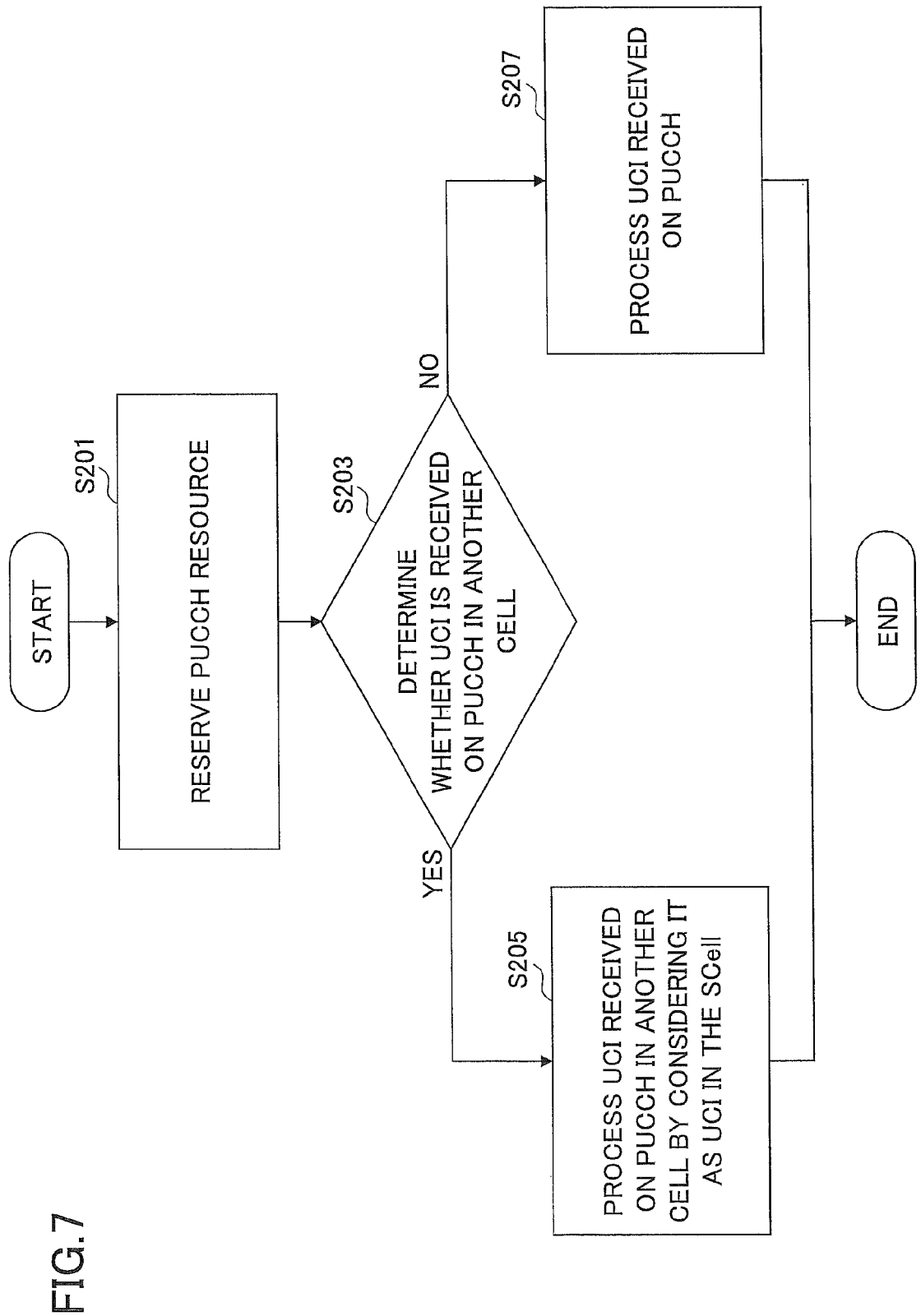
FIG. 7 shows a flowchart of a control method in a base station in accordance with an embodiment of the present invention.

FIG. 7 shows a control method in the base station 200 in accordance with an embodiment of the present invention.

At step S201, the UL resource management unit 240 reserves a PUCCH resource in a secondary cell in which transmission of the PUCCH is supported, and reserves a PUCCH resource for the secondary cell also in the primary cell or another secondary cell in which transmission of the POOCH is supported.

At step S203, the control information processing unit 250 monitors the PUCCH resource reserved by the UL resource management unit 240 and determines whether UCI (uplink control information) to be transmitted on the PUCCH in the secondary cell is received in another cell.

When the uplink control information to be transmitted on the POOCH in the secondary cell is received in anther cell (S203: YES), at step S205, the control information processing unit 250 processes the uplink control information for the secondary cell, even if the uplink control information to be transmitted on the PUCCH in the secondary cell is received in another cell.

When the uplink control information to be transmitted on the POOCH in the secondary cell is not received in another cell (S203: NO), that is, when the uplink control information of the PUCCH in the secondary cell in which transmission of the PUCCH is supported is received in the secondary cell, at step S207, the control information processing unit 250 processes the received uplink control information as usual.

(2) An Approach to Stop Transmission of the PUCCH in a Deactivated Secondary Cell <Configurations and Operations of a Mobile Station>

In this approach, the mobile station 100 is also configured as shown in FIG. 4.

The DL signal reception unit 110 receives radio signals including data and/or control information from a base station via a primary cell and/or a secondary cell, as described with reference to FIG. 4. The control information includes control information indicating a PUSCH resource allocated by the base station. In this approach, a PUCCH resource is not reserved such that uplink control information to be transmitted on the PUCCH can be received in a cell other than the secondary cell, in preparation for inconsistency of the activation/deactivation state of the secondary cell.

The UL signal transmission unit 120 transmits radio signals including data and/or control information to a base station via a primary cell and/or a secondary cell, as described with reference to FIG. 4. When PUCCH transmission is stopped in the secondary cell, the UL signal transmission unit 120 may transmit uplink control information to be transmitted on the PUCCH in the secondary cell using the PUSCH, as described below.

The SCell state management unit 130 manages whether the state of a secondary cell is the activation state or the deactivation state, as described with reference to FIG. 4.

The UL resource management unit 140 manages uplink radio resources, as described with reference to FIG. 4. In this approach, the UL resource management unit 140 manages a PUSCH resource allocated by the base station. In this approach, when the DL signal reception unit 110 receives control information indicating a PUSCH resource, the UL resource management unit 140 provides the PUSCH resource specified by the base station to the UL signal transmission unit 120 and the transmission control unit 150.

The transmission control unit 150 controls transmission of radio signals from the UL signal transmission unit 120. In connection with PUCCH transmission, the transmission control unit 150 checks the state of the secondary cell managed by the SCell state management unit 130 at a timing of PUCCH transmission in the secondary cell. When the state of the secondary cell is the deactivation state, the transmission control unit 150 stops transmission of uplink control information on the PUCCH in the secondary cell. When a PUSCH resource is available (allocated) at the timing of transmission of the PUCCH in the secondary cell, the transmission control unit 150 may control transmission such that the uplink control information to be transmitted on the PUCCH in the secondary cell using the PUSCH. For example, the uplink control information to be transmitted on the PUCCH may be piggybacked onto the PUSCH.

Figure 8:
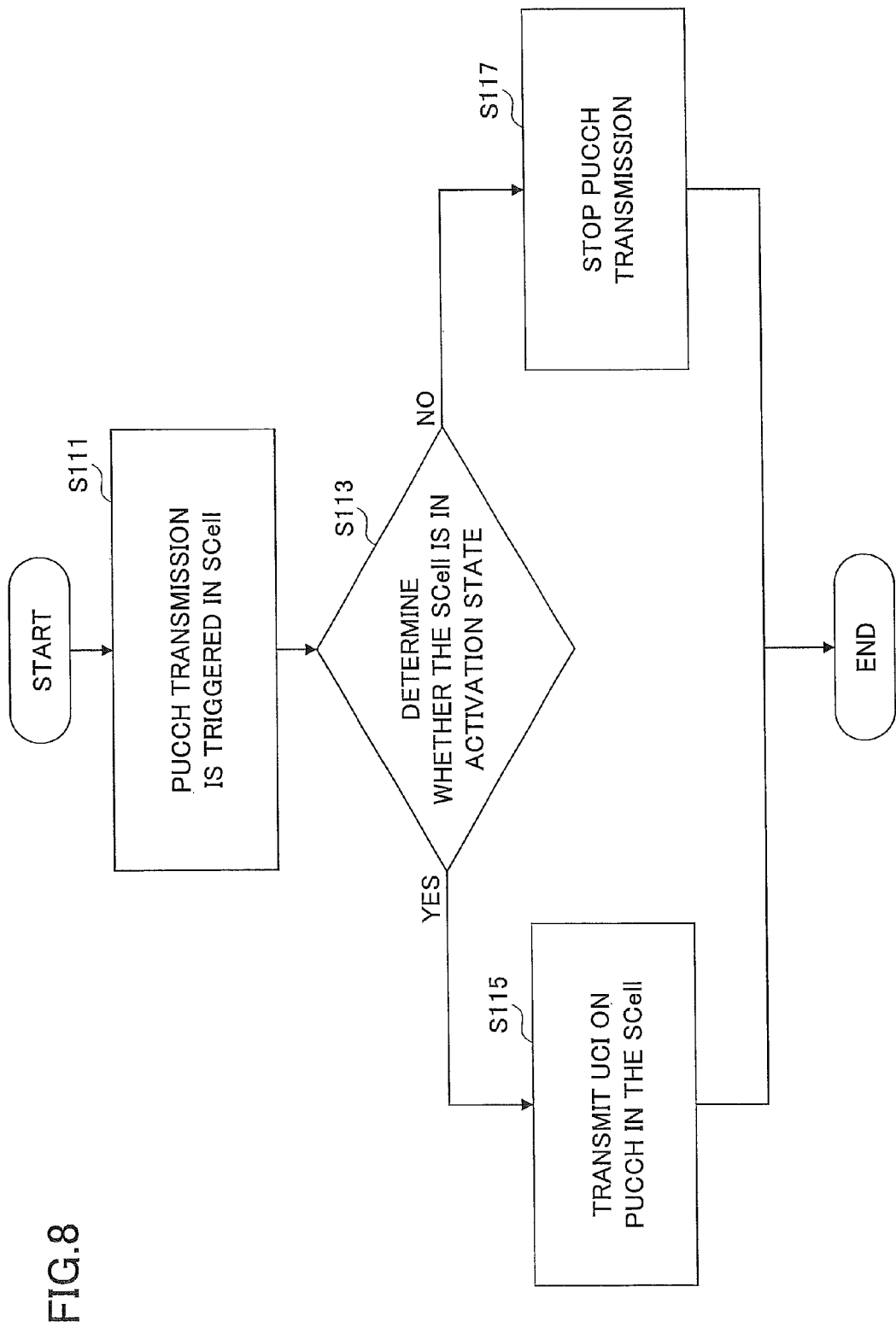
FIG. 8 shows a flowchart of a control method in a mobile station in accordance with an embodiment of the present invention.

FIG. 8 shows a control method in the mobile station 100 in accordance with an embodiment of the present invention.

At step S111, PUCCH transmission in a secondary cell is triggered. In other words, the transmission control unit 150 determines that a timing of PUCCH transmission in the secondary cell arrives.

At step S113, the transmission control unit 150 checks the state of the secondary cell managed by the SCell state management unit 130. When the state of the secondary cell in which uplink control information is to be transmitted on the PUCCH is the activation state (S113: YES), at step S115, the transmission control unit 150 controls transmission such that UCI (uplink control information) such as an ACK/NACK, a SR, or a CQI is transmitted in the secondary cell.

On the other hand, when the state of the secondary cell in which uplink control information is to be transmitted on the PUCCH is the deactivation state (S113: NO), at step S117, the transmission control unit 105 stops transmission of the uplink control information in the secondary cell. When a PUSCH resource is available, the transmission control unit 150 may control transmission such that the uplink control information to be transmitted on the PUCCH in the secondary cell using the PUSCH.

<Configurations and Operations of a Base Station>

In this approach, the base station 200 is also configured as shown in FIG. 6.

The UL signal reception unit 210 receives radio signals including data and/or control information from a mobile station via a primary cell or a secondary cell, as described with reference to FIG. 6. In this approach, the base station 200 does not reserve a PUCCH resource such that uplink control information to be transmitted on the PUCCH can be received in a cell other than the secondary cell, in preparation for inconsistency of the activation/deactivation state of the secondary cell. When a PUSCH resource is available (allocated) at the timing of transmission of the PUCCH in the secondary cell, the UL signal reception unit 210 may receive the uplink control information to be transmitted on the PUCCH in the secondary cell using the PUSCH.

The DL signal transmission unit 220 transmits radio signals including data and/or control information to a mobile station via a primary cell and/or a secondary cell, as described with reference to FIG. 6.

The SCell state management unit 230 manages whether the state of a secondary cell is the activation state or the deactivation state, as described with reference to FIG. 6.

When uplink control information of the PUCCH is received on the PUSCH, the SCell state management unit 230 may determine that the state of the secondary cell in the base station 200 is inconsistent with the state of the secondary cell in the mobile station. In this case, the SCell state management unit 230 may set the state of the secondary cell to the deactivation state. Alternatively, the SCell state management unit 230 may allow the mobile station to transition the secondary cell to the activation state by transmitting a MAC CE to the mobile station.

The UL resource management unit 240 manages uplink resources. In this approach, the UL resource management unit 204 reserves a PUCCH resource and allocates a PUSCH resource to a mobile station.

The control information processing unit 250 monitors the PUCCH resource and the PUSCH resource managed by the UL resource management unit 240 and processes uplink control information of the PUCCH in the secondary cell. When the uplink control information of the PUCCH in a secondary cell in which transmission of the PUCCH is supported is received in the secondary cell, the control information processing unit 250 uses the received uplink control information for scheduling or the like. Even if the uplink control information to be transmitted on the PUCCH in the secondary cell is received on the PUSCH, the control information processing unit 250 uses the received uplink control information for scheduling or the like.

Figure 9:
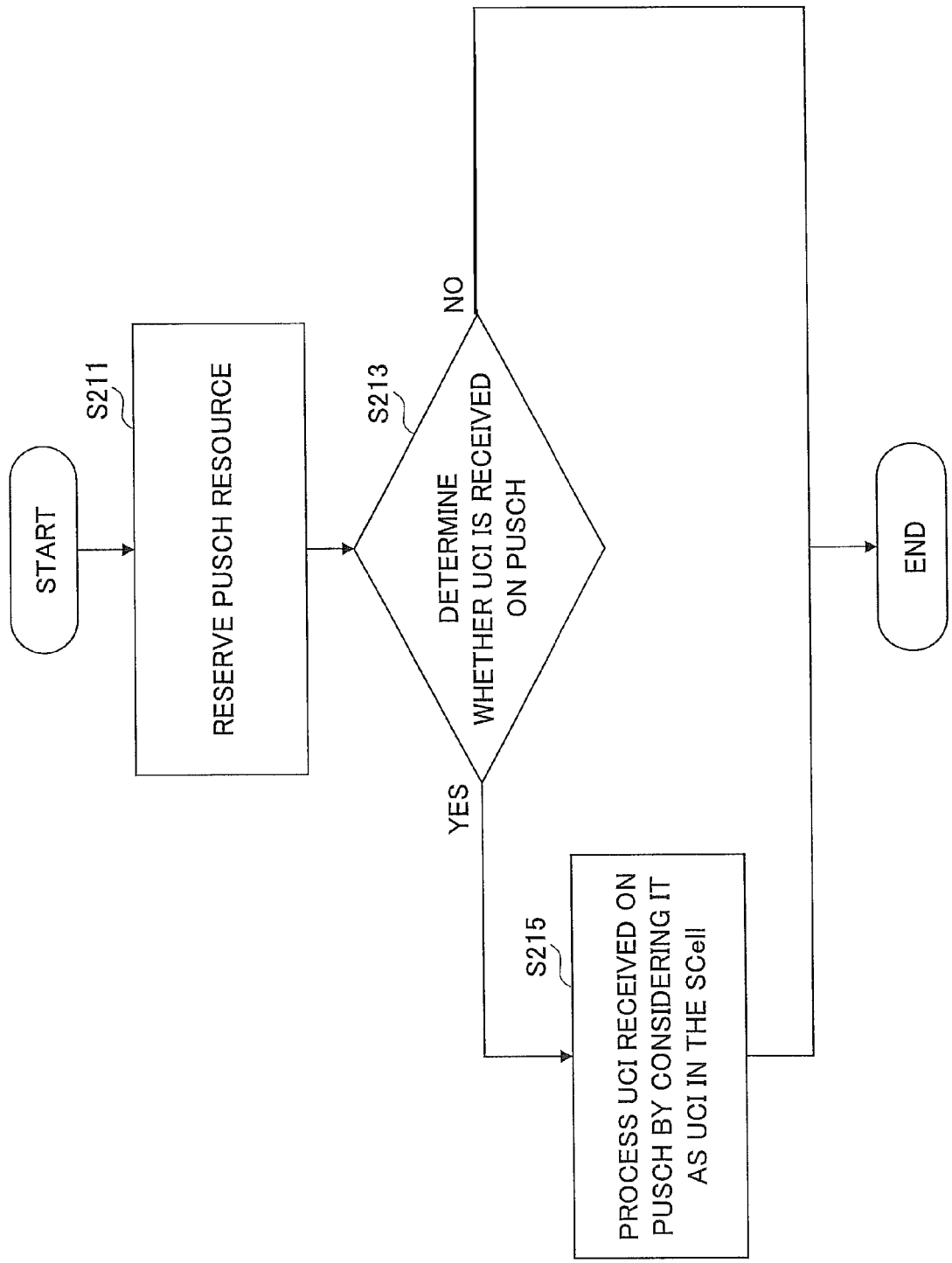
FIG. 9 shows a flowchart of a control method in a base station in accordance with an embodiment of the present invention.

FIG. 9 shows a control method in the base station 200 in accordance with an embodiment of the present invention.

At step S211, the UL resource management unit 240 reserves a PUCCH resource and allocates a PUSCH resource to a mobile station.

At step S213, the control information processing unit 250 monitors the PUSCH resource allocated by the UL resource management unit 240 and determines whether UCI (uplink control information) to be transmitted on the PUCCH in the secondary cell is received on the PUSCH.

When the uplink control information to be transmitted on the PUCCH in the secondary cell is received on the PUSCH (S213: YES), at step S215, the control information processing unit 250 processes the uplink control information of the PUCCH, even if the uplink control information to be transmitted on the PUCCH in the secondary cell is received on the PUSCH. When the uplink control information of the PUCCH in the secondary cell is not received on the PUSCH (S213: NO), that is, when the uplink control information is received on the PUCCH, the control information processing unit 250 processes the received uplink control information as usual.

(3) An Approach to Provide a Notification to a Base Station that the State of a Secondary Cell in which Transmission of the PUCCH is Supported is the Deactivation State <Configurations and Operations of a Mobile Station>

Figure 10:
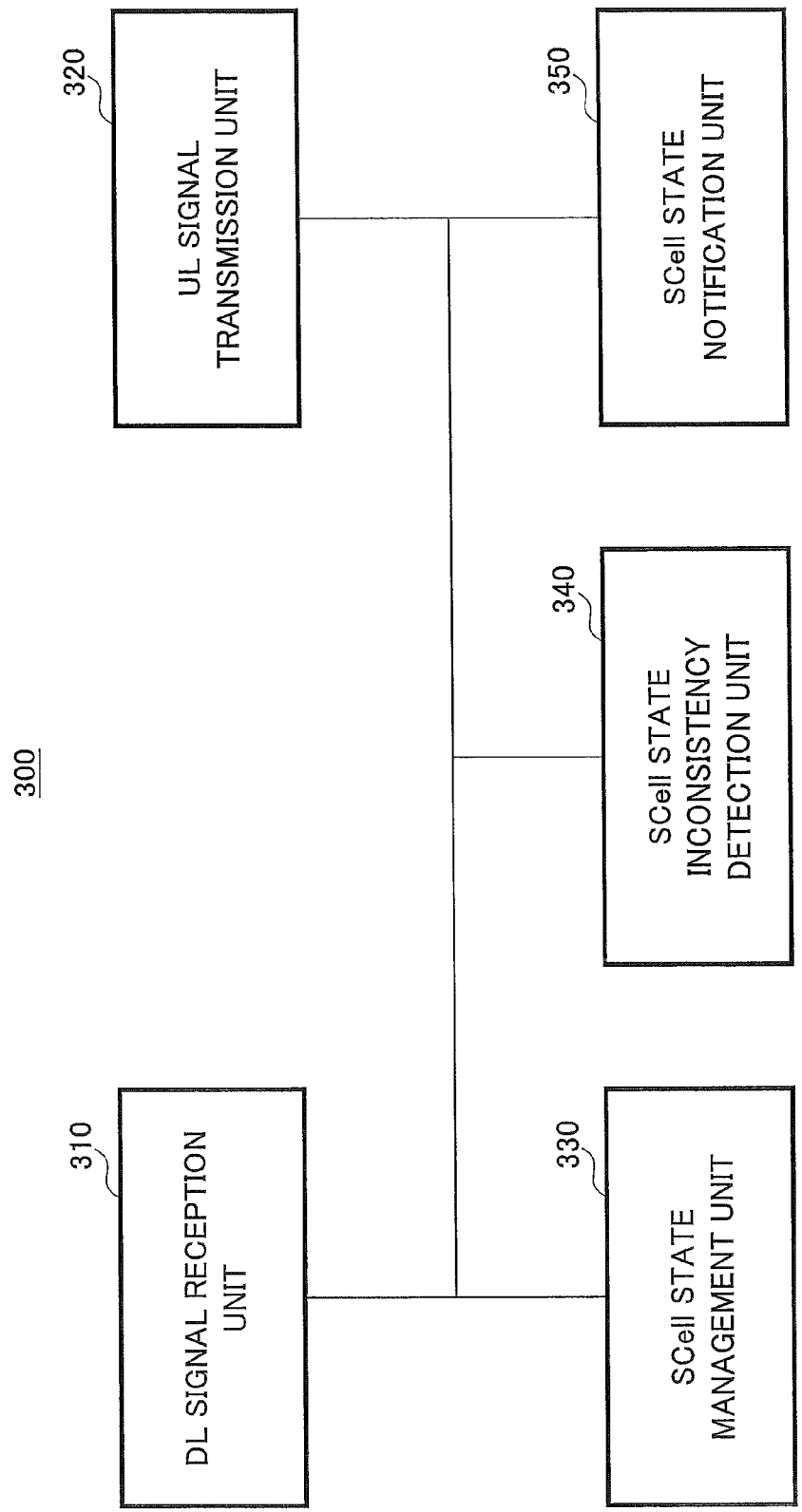
FIG. 10 shows a block diagram of a mobile station in accordance with an embodiment of the present invention.

FIG. 10 shows a configuration of a mobile station 300 in accordance in an embodiment of the present invention. The mobile station 300 includes a downlink (DL) signal reception unit 310, an uplink (UL) signal transmission unit 320, a secondary cell (SCell) state management unit 330, a secondary cell (SCell) state inconsistency detection unit 340, and a secondary cell (SCell) state notification unit 350.

As described with reference to FIG. 4, the DL signal reception unit 310 receives radio signals including data and/or control information from a base station via a primary cell and/or a secondary cell. In this approach, the base station does not reserve a PUCCH resource such that uplink control information to be transmitted on the PUCCH can be received in a cell other than the secondary cell, in preparation for inconsistency of the activation/deactivation state of the secondary cell.

As described with reference to FIG. 4, the UL signal transmission unit 320 transmits radio signals including data and/or control information to a base station via a primary cell and/or a secondary cell.

As described with reference to FIG. 4, the SCell state management unit 330 manages whether the state of a secondary cell is the activation state or the deactivation state.

The SCell state inconsistency detection unit 340 detects inconsistency of the state of the secondary cell between the mobile station 300 and a base station. In this approach, the SCell state inconsistency detection unit 340 detects inconsistency of the state where the state of the secondary cell managed by the SCell state management unit 330 is the deactivation state and the state of the secondary cell managed by the base station is the activation state. Typically, the secondary cell in which transmission of the PUCCH is supported needs to be in the activation state with the PUCCH being configured to transmit feedback information to the base station. In this situation, when a MAC CE for transitioning the secondary cell to the deactivation state is erroneously received from the base station, or when only the SCell Deactivation Timer in the mobile station 300 expires because of misalignment of the SCell Deactivation Timer, the SCell state inconsistency detection unit 340 can detect inconsistency of the state. Alternatively, the SCell state inconsistency detection unit 340 may detect inconsistency of the state when PUCCH transmission of the secondary cell is triggered whereas the state of the secondary cell managed by the SCell state management unit 330 is the deactivation state.

The SCell state notification unit 350 transmits a notification to the base station that the state of the secondary cell is the deactivation state, when inconsistency of the state of the secondary cell is detected by the SCell state inconsistency detection unit 340. The SCell state notification unit 350 may transmit the notification to the base station when inconsistency of the state is detected or when PUCCH transmission is triggered. In addition, this notification may be transmitted by means of a signal in any layer such as a MAC CE, an RRC signal, a physical-layer signal.

Figure 11:
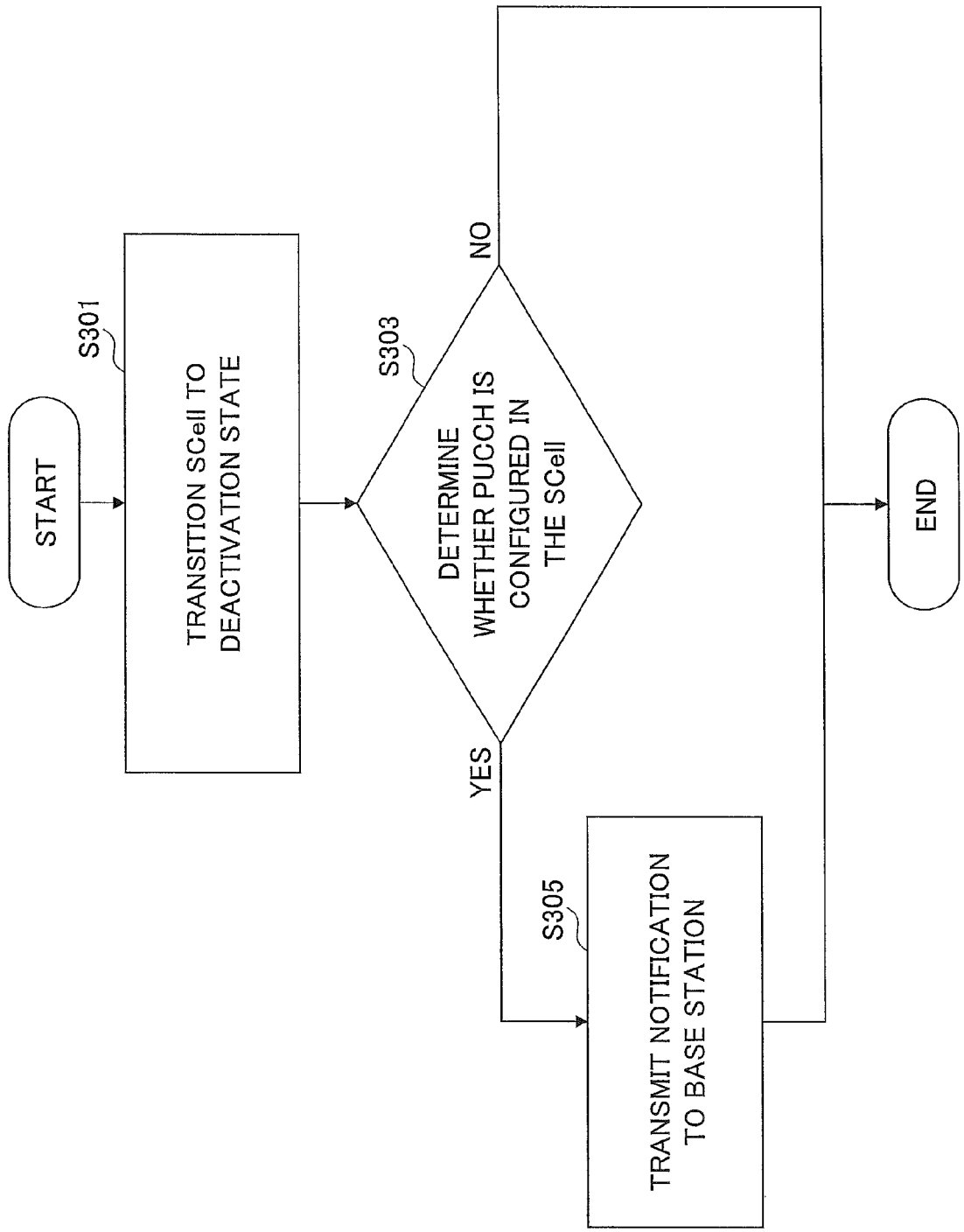
FIG. 11 shows a flowchart of a control method in a mobile station in accordance with an embodiment of the present invention.

FIG. 11 shows a control method in the mobile station 300 in accordance with an embodiment of the present invention.

At step S301, the SCell state management unit 330 transitions a secondary cell to the deactivation state in response to an instruction from a base station or an expiration of the SCell Deactivation Timer.

At step S303, the SCell state inconsistency detection unit 340 determines whether the PUCCH is configured in the secondary cell transitioned to the deactivation state. When the PUCCH is configured in the secondary cell, the SCell state inconsistency detection unit 340 detects inconsistency of the state of the secondary cell between the mobile station 300 and the base station.

When the PUCCH is configured in the secondary cell transitioned to the deactivation state (S303: YES), the SCell state notification unit 350 transmits a notification to the base station that the state of the secondary cell is the deactivation state. When the PUCCH is not configured in the secondary cell transitioned to the deactivation state (S303: NO), the SCell state notification unit 350 does not transmit the notification to the base station since the state is consistent.

<Configurations and Operations of a Base Station>

Figure 12:
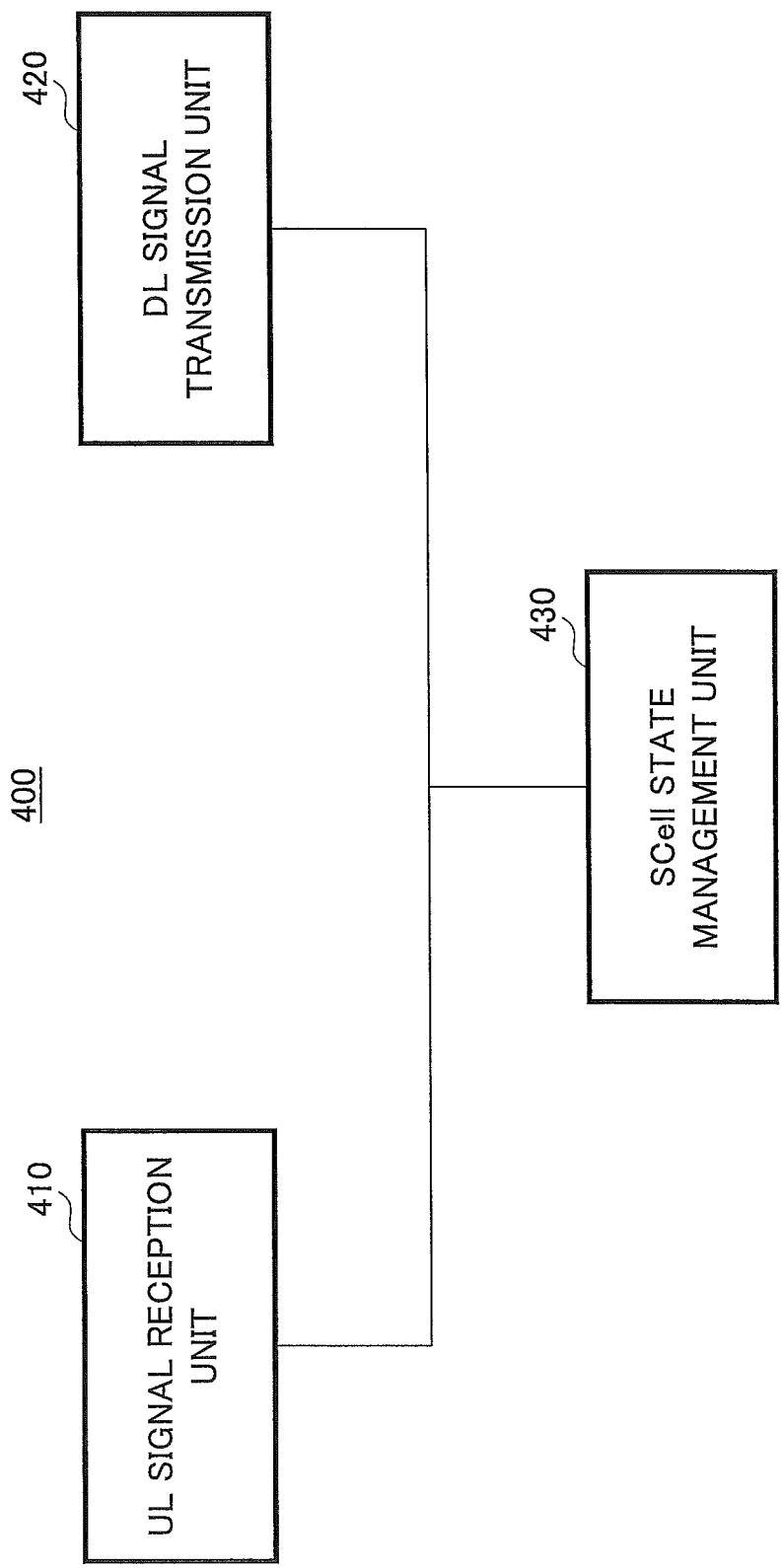
FIG. 12 shows a block diagram of a base station in accordance with an embodiment of the present invention.

FIG. 12 shows a configuration of a base station 400 in accordance with an embodiment of the present invention. The base station 400 includes an uplink (UL) signal reception unit 410, a downlink (DL) signal transmission unit 420, and a secondary cell (SCell) state management unit 430.

The UL signal reception unit 410 receives radio signals including data and/or control information from a mobile station via a primary cell or a secondary cell. In this approach, the UL signal reception unit 410 may receive a notification from the mobile station that the state of the secondary cell is the deactivation state.

The DL signal transmission unit 420 transmits radio signals including data and/or control information to a mobile station via a primary cell and/or a secondary cell.

As described with reference to FIG. 6, the SCell state management unit 430 manages whether the state of a secondary cell is the activation state or the deactivation state. When the notification that the state of the secondary cell is deactivation state is received regardless of the secondary cell in the activation state, the SCell state management unit 430 determines that the state of the secondary cell in the base station 400 is inconsistent with the state of the secondary cell in the mobile station. In this case, the SCell state management unit 430 may set the state of the secondary cell to the deactivation state. Alternatively, the SCell state management unit 430 may allow the mobile station to transition the secondary cell to the activation state by transmitting a MAC CE to the mobile station, and may restart the SCell Deactivation Timer.

Figure 13:
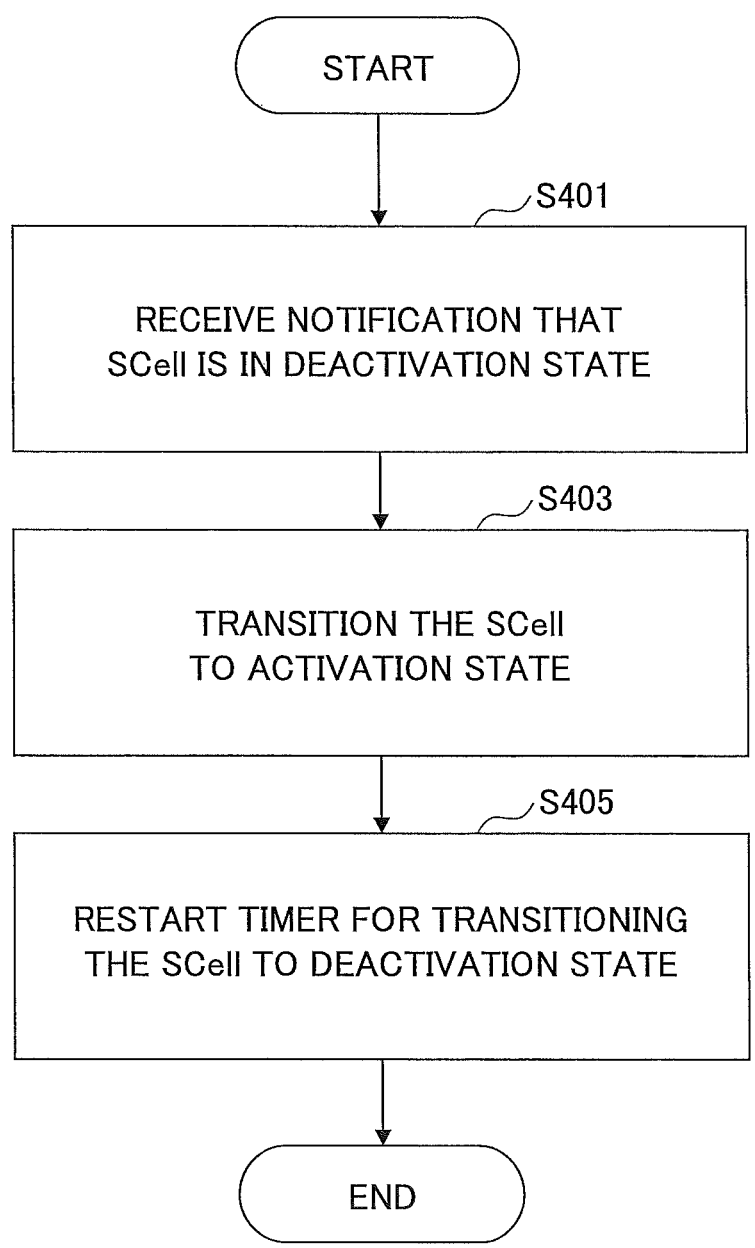
FIG. 13 shows a flowchart of a control method in a base station in accordance with an embodiment of the present invention.

FIG. 13 shows a control method in the base station 400 in accordance with an embodiment of the present invention.

At step S401, the UL signal reception unit 410 receives a notification from a mobile station that the state of the secondary cell is the deactivation state. When the notification that the state of the secondary cell is deactivation state is received regardless of the secondary cell in the activation state, the SCell state management unit 430 determines that the state of the secondary cell in the base station 400 is inconsistent with the state of the secondary cell in the mobile station.

At step S403, when the SCell state management unit 430 determines inconsistency of the state of the secondary cell, the SCell state management unit 430 allows the mobile station to transition the secondary cell to the activation state.

At step S405, the SCell state management unit 430 restarts the SCell Deactivation Timer.

At step S403, the SCell state management unit 430 may simply set the state of the secondary cell in the SCell state management unit 430 to the deactivation state, rather than allowing the mobile station to transition the secondary cell to the deactivation state.

(4) An Approach not to Transition a Secondary Cell in which Transmission of the PUCCH is Supported to the Deactivation State <Configurations and Operations of a Mobile Station>

Figure 14:
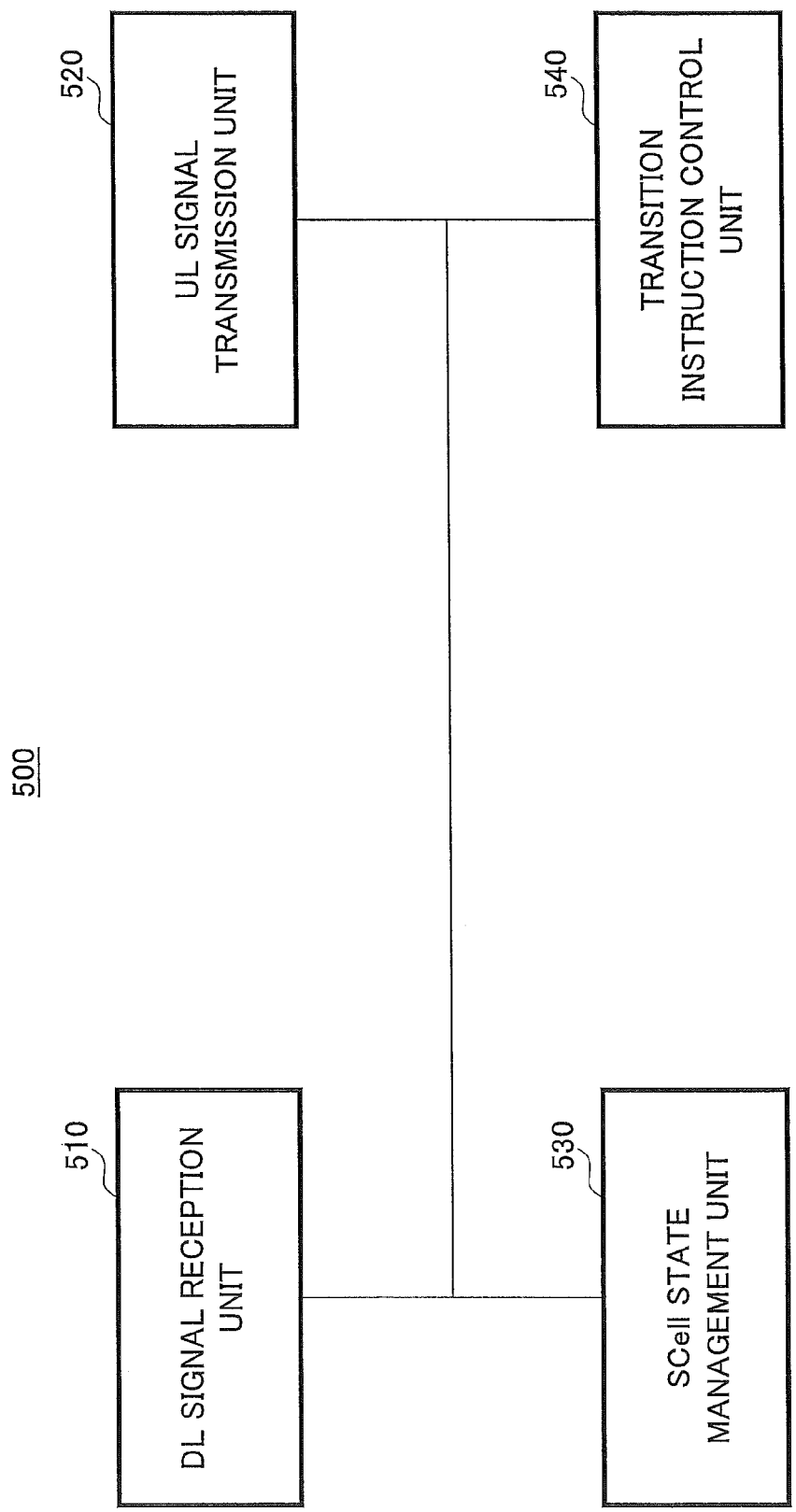
FIG. 14 shows a block diagram of a mobile station in accordance with an embodiment of the present invention.

FIG. 14 shows a configuration of a mobile station 500 in accordance in an embodiment of the present invention. The mobile station 500 includes a downlink (DL) signal reception unit 510, an uplink (UL) signal transmission unit 520, a secondary cell (SCell) state management unit 530, and a transition instruction control unit 540.

As described with reference to FIG. 4, the DL signal reception unit 310 receives radio signals including data and/or control information from a base station via a primary cell and/or a secondary cell. The control information includes an instruction (MAC CE) to transition a secondary cell to the deactivation state. In this approach, the base station does not reserve a PUCCH resource such that uplink control information to be transmitted on the PUCCH can be received in a cell other than the secondary cell, in preparation for inconsistency of the activation/deactivation state of the secondary cell.

As described with reference to FIG. 4, the UL signal transmission unit 520 transmits radio signals including data and/or control information to a base station via a primary cell and/or a secondary cell.

As described with reference to FIG. 4, the SCell state management unit 530 manages whether the state of a secondary cell is the activation state or the deactivation state. In addition, the SCell state management unit 530 manages whether transmission of the PUCCH is supported in the secondary cell.

When an instruction to transition a secondary cell in which transmission of the PUCCH is supported to the deactivation state is received from a base station, the transition instruction control unit 540 discards the instruction. When the instruction is discarded, the transition instruction control unit 540 may transmit a notification via the UL signal transmission unit 520 to the base station that the instruction is discarded. In addition, the state instruction control unit 540 does not transition the secondary cell to the deactivation state when the SCell Deactivation Timer expires.

Figure 15:
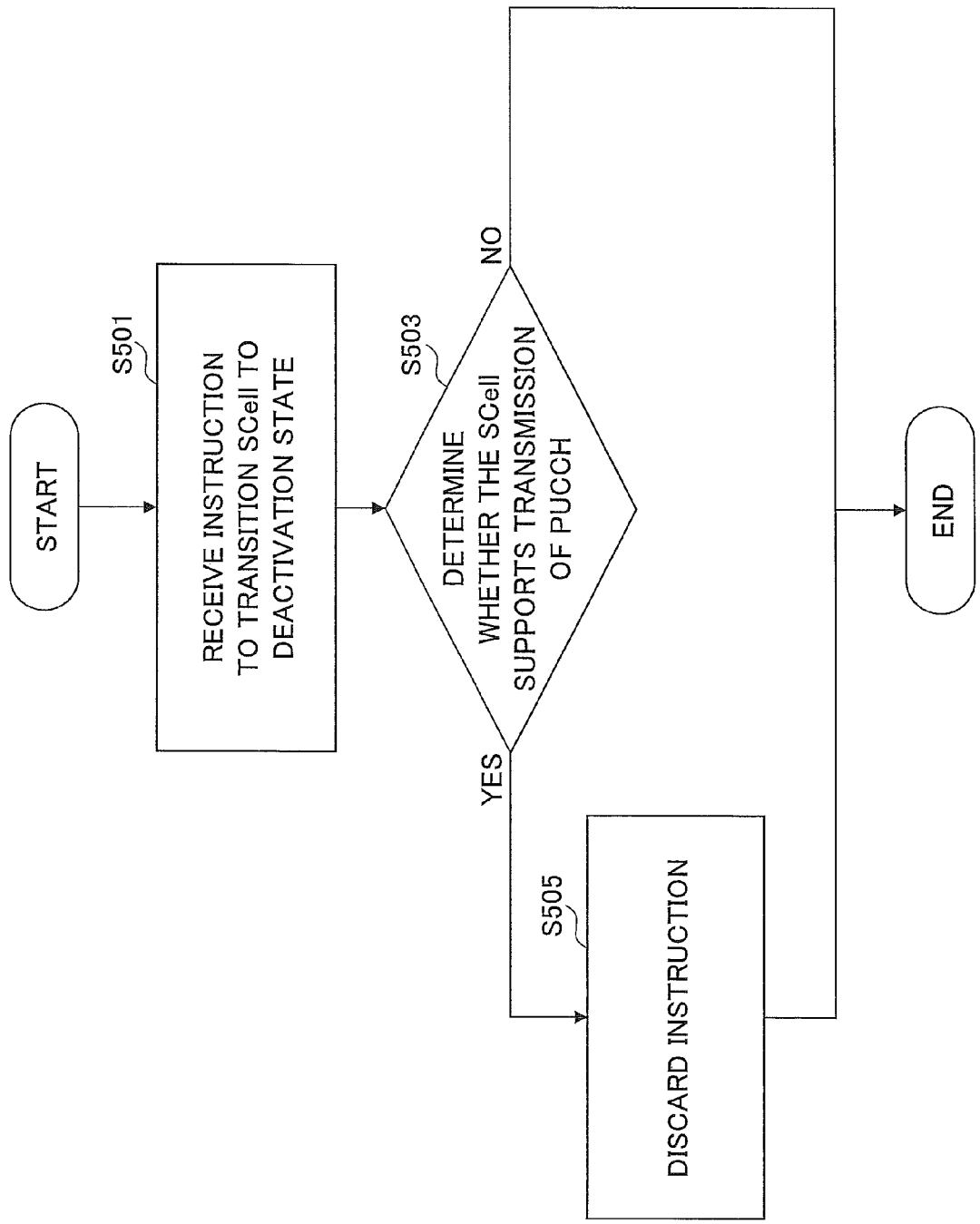
FIG. 15 shows a flowchart of a control method in a mobile station in accordance with an embodiment of the present invention.

FIG. 15 shows a control method in the mobile station 500 in accordance with an embodiment of the present invention.

At step S501, the UL signal reception unit 510 receives an instruction from a base station to transition a secondary cell to the deactivation state.

At step S503, the transition instruction control unit 540 determines whether the instruction from the base station is an instruction for a secondary cell in which transmission of the PUCCH is supported.

When the instruction to transition the secondary cell in which transmission of the PUCCH is supported to the deactivation state is received (S503: YES), at step S505, the transition instruction control unit 540 discards the instruction. When the instruction to transition the secondary cell in which transmission of the PUCCH is not supported to the deactivation state is received (S503: NO), the transition instruction control unit 540 transition the secondary cell to the deactivation state as usual.

In this approach, since the base station does not receive an ACK (acknowledgement) in response to a MAC CE to activate the secondary cell, the base station does not set the state of the secondary cell to the deactivation state.

(5) Effects of Embodiments

According to an embodiment of the present invention, it is possible for a mobile station and a base station to handle the PUCCH in the secondary cell, even if the mobile station keeps the secondary cell in the deactivation state but the base station understands that the secondary cell is in the activation state.

According to the approach to transmit the PUCCH in another cell in which transmission of the PUCCH is supported, a base station can receive uplink control information on the PUCCH regardless of consistency/inconsistency of the state of the secondary cell, because a PUCCH resource is reserved in another cell.

According to the approach to stop transmission of the PUCCH in a deactivated secondary cell, a PUCCH resource need not be reserved in another cell, and thus there is no need to consider a shortage of the PUCCH resource.

According to the approach to provide a notification to a base station that the state of a secondary cell in which transmission of the PUCCH is supported is the deactivation state, inconsistency of the state of the secondary cell can be avoided between the base station and the mobile station, and thus uplink control information on the PUCCH is handled under normal conditions.

According to the approach not to transition a secondary cell in which transmission of the PUCCH is supported to the deactivation state, inconsistency of the state of the secondary cell can be avoided between the base station and the mobile station.

For convenience of explanation, the mobile station and the base station according to the embodiments of the present invention have been described with reference to functional block diagrams, but the mobile station and the base station may be implemented in hardware, software, or combinations thereof. In addition, two or more functional elements may be combined as appropriate. The method according to the embodiments of the present invention has been described with reference to flowcharts, but the method may be carried out in a different order from the order shown in the embodiments.

While the approaches are described above to make it possible for a mobile station and a base station to handle the PUCCH in the secondary cell, even if the mobile station keeps the secondary cell in the deactivation state but the base station understands that the secondary cell is in the activation state, the present invention is not limited to the these embodiments, and variations, modifications, alterations, and substitutions can be made by those skilled in the art without deviating from the spirit of the present invention.

For example, a mobile station, a base station, and a control method in one aspect of the present invention can be represented as follows:

(1) A mobile station for communication using carrier aggregation, comprising:

a secondary cell state management unit configured to manage whether a state of a secondary cell is an activation state or a deactivation state; and a transmission control unit configured to stop transmission of uplink control information on a physical uplink control channel in a first secondary cell, when the state of the first secondary cell managed by the secondary cell state management unit is the deactivation state at a timing of transmission of the physical uplink control channel in the first secondary cell.

(2) The mobile station of (1), wherein the transmission control unit controls transmission such that the uplink control information to be transmitted on the physical uplink control channel in the first secondary cell is transmitted using either a physical uplink control channel in a primary cell or a physical uplink control channel in a second secondary cell in the activation state at the timing of transmission of the physical uplink control channel in the first secondary cell.

(3) The mobile station of (2), wherein the transmission control unit selects a cell in which the uplink control information to be transmitted on the physical uplink control channel in the first secondary cell is transmitted, based on a secondary cell index or cell quality.

(4) The mobile station of (1), further comprising:

a resource management unit configured to manage a resource for a physical uplink shared channel, wherein the transmission control unit controls transmission such that the uplink control information to be transmitted on the physical uplink control channel in the first secondary cell is transmitted using the physical uplink shared channel, when a resource for the physical uplink shared channel is available at the timing of transmission of the physical uplink control channel in the first secondary cell.

(5) A control method in a mobile station for communication using carrier aggregation, comprising the steps of:

managing, by a secondary cell state management unit, whether a state of a secondary cell is an activation state or a deactivation state; and stopping transmission of uplink control information on a physical uplink control channel in a first secondary cell, when the state of the first secondary cell managed by the secondary cell state management unit is the deactivation state at a timing of transmission of the physical uplink control channel in the first secondary cell.

(6) A base station for communication using carrier aggregation, comprising:

a resource management unit configured to reserve a resource for a physical uplink control channel in a first secondary cell in which transmission of the physical uplink control channel is supported, and reserve a resource for uplink control information to be transmitted on the physical uplink control channel in the first secondary cell also in a primary cell or a second secondary cell in which transmission of the physical uplink control channel is supported; and a control information processing unit configured to process received uplink control information, when the uplink control information to be transmitted on the physical uplink control channel in the first secondary cell is received with the resource for the physical uplink control channel reserved by the resource management unit.

(7) A control method in a base station for communication using carrier aggregation, comprising the steps of:

reserving a resource for a physical uplink control channel in a first secondary cell in which transmission of the physical uplink control channel is supported, and reserving a resource for uplink control information to be transmitted on the physical uplink control channel in the first secondary cell also in a primary cell or a second secondary cell in which transmission of the physical uplink control channel is supported; and processing received uplink control information, when the uplink control information to be transmitted on the physical uplink control channel in the first secondary cell is received with the reserved resource for the physical uplink control channel.

(8) A base station for communication using carrier aggregation, comprising:

a resource management unit configured to allocate a resource for a physical uplink shared channel to a mobile station; and a control information processing unit configured to process received uplink control information, when the uplink control information to be transmitted on a physical uplink control channel in a secondary cell is received from the mobile station with the resource for the physical uplink shared channel allocated by the resource management unit.

(9) A control method in a base station for communication using carrier aggregation, comprising the steps of:

allocating a resource for a physical uplink shared channel to a mobile station; and processing received uplink control information, when the uplink control information to be transmitted on a physical uplink control channel in a secondary cell is received from the mobile station with the allocated resource for the physical uplink shared channel.

(10) A mobile station for communication using carrier aggregation, comprising:

a secondary cell state management unit configured to manage whether a state of a secondary cell is an activation state or a deactivation state;

a state inconsistency detection unit configured to detect inconsistency of a state where the state of the secondary cell managed by the secondary cell state management unit is the deactivation state and a state of the secondary cell managed by a base station is the activation state; and a transmission unit configured to transmit a notification to the base station that the state of the secondary cell is the deactivation state, when the inconsistency of the state of the secondary cell is detected by the state inconsistency detection unit.

(11) A control method in a mobile station for communication using carrier aggregation, comprising the step of:

managing, by a secondary cell state management unit, whether a state of a secondary cell is an activation state or a deactivation state;

detecting inconsistency of a state where the state of the secondary cell managed by the secondary cell state management unit is the deactivation state and a state of the secondary cell managed by a base station is the activation state; and transmitting a notification to the base station that the state of the secondary cell is the deactivation state, when the inconsistency of the state of the secondary cell is detected.

(12) A base station for communication using carrier aggregation, comprising:

a secondary cell state management unit configured to manage whether a state of a secondary cell is an activation state or a deactivation state; and a reception unit configured to receive a notification from a mobile station that the state of the secondary cell is the deactivation state;

wherein the secondary cell state management unit transitions the secondary cell of the mobile station to the activation state, when the secondary cell is in the activation state but the notification that the state of the secondary cell is the deactivation state is received by the reception unit.

(13) The base station of (12), wherein:
the secondary cell state management unit restarts a timer configured to transition the secondary cell of the mobile station to the deactivation state.

(14) A control method in a base station for communication using carrier aggregation, comprising:
managing, by a secondary cell state management unit, whether a state of a secondary cell is an activation state or a deactivation state;
receiving a notification from a mobile station that the state of the secondary cell is the deactivation state; and
transitioning the secondary cell of the mobile station to the activation state, when the state of the secondary cell is the activation state but the notification that the state of the secondary cell is the deactivation state is received.

(15) A mobile station for communication using carrier aggregation, comprising:
a reception unit configured to receive an instruction from a base station to transition a secondary cell to a deactivation state; and
a transition instruction control unit configured to discard the instruction received by the reception unit, when the instruction received by the reception unit is an instruction for a secondary cell in which transmission of a physical uplink control channel is supported.

(16) The mobile station of (15), further comprising:
a transmission unit configured to transmit a notification to the base station that the instruction is discarded, when the instruction is discarded by the transition instruction control unit.

(17) The mobile station of (15) or (16), wherein the transition instruction control unit keeps the secondary cell in the activation state when an timer expires, the timer being set to transition the secondary cell in which transmission of the physical uplink control channel is supported to the deactivation state.

(18) A control method in a mobile station for communication using carrier aggregation, comprising the steps of:
receiving an instruction from a base station to transition a secondary cell to a deactivation state; and
discarding the received instruction, when the received instruction is an instruction for a secondary cell in which transmission of a physical uplink control channel is supported.

The present international application is based on and claims the benefit of priority of Japanese Patent Application No. 2012-262579 filed on Nov. 30, 2012, the entire contents of which are hereby incorporated by reference.

DESCRIPTION OF NOTATIONS 100 mobile station
110 downlink (DL) signal reception unit
120 uplink (UL) signal transmission unit
130 secondary cell (SCell) state management unit
140 uplink (UL) resource management unit
150 transmission control unit
200 base station
210 uplink (UL) signal reception unit
220 downlink (DL) signal transmission unit
230 secondary cell (SCell) state management unit
240 uplink (UL) resource management unit
250 control information processing unit
300 mobile station
310 downlink (DL) signal reception unit
320 uplink (UL) signal transmission unit
330 secondary cell (SCell) state management unit
340 secondary cell (SCell) state inconsistency detection unit
350 secondary cell (SCell) state notification unit
400 base station
410 uplink (UL) signal reception unit
420 downlink (DL) signal transmission unit
430 secondary cell (SCell) state management unit
500 mobile station
510 downlink (DL) signal reception unit
520 uplink (UL) signal transmission unit
530 secondary cell (SCell) state management unit
540 transition instruction control unit

The invention claimed is:

1. A mobile station for communication using carrier aggregation, comprising:
a secondary cell state management circuitry configured to manage whether a state of a secondary cell is an activation state or a deactivation state;
a transmission control circuitry configured to stop transmission of uplink control information on a physical uplink control channel in a first secondary cell, when the state of the first secondary cell managed by the secondary cell state management circuitry is the deactivation state at a timing of transmission of the physical uplink control channel in the first secondary cell; and
a resource management circuitry configured to manage a resource for a physical uplink shared channel,
wherein the transmission control circuitry controls transmission such that the uplink control information to be transmitted on the physical uplink control channel in the first secondary cell is transmitted using the physical uplink shared channel, when a resource for the physical uplink shared channel is available at the timing of transmission of the physical uplink control channel in the first secondary cell.

2. The mobile station as claimed in claim 1, wherein the transmission control circuitry controls transmission such that the uplink control information to be transmitted on the physical uplink control channel in the first secondary cell is transmitted using either a physical uplink control channel in a primary cell or a physical uplink control channel in a second secondary cell in the activation state at the timing of transmission of the physical uplink control channel in the first secondary cell.

3. The mobile station as claimed in claim 2, wherein the transmission control circuitry selects a cell in which the uplink control information to be transmitted on the physical uplink control channel in the first secondary cell is transmitted, based on a secondary cell index or cell quality.

4. A control method in a mobile station for communication using carrier aggregation, comprising the steps of:
managing, by a secondary cell state management circuitry, whether a state of a secondary cell is an activation state or a deactivation state;
stopping transmission of uplink control information on a physical uplink control channel in a first secondary cell, when the state of the first secondary cell managed by the secondary cell state management circuitry is the deactivation state at a timing of transmission of the physical uplink control channel in the first secondary cell; and
managing a resource for a physical uplink shared channel, wherein the uplink control information to be transmitted on the physical uplink control channel in the first secondary cell is transmitted using the physical uplink shared channel, when a resource for the physical uplink shared channel is available at the timing of transmission of the physical uplink control channel in the first secondary cell.

5. A mobile station for communication using carrier aggregation, comprising:
   a secondary cell state management circuitry configured to manage whether a state of a secondary cell is an activation state or a deactivation state;
   a state inconsistency detection circuitry configured to detect inconsistency of a state where the state of the secondary cell managed by the secondary cell state management circuitry is the deactivation state and a state of the secondary cell managed by a base station is the activation state; and
   a transmission circuitry configured to transmit a notification to the base station that the state of the secondary cell is the deactivation state, when the inconsistency of the state of the secondary cell is detected by the state inconsistency detection circuitry.

6. A control method in a mobile station for communication using carrier aggregation, comprising the step of:
   managing, by a secondary cell state management circuitry, whether a state of a secondary cell is an activation state or a deactivation state;
   detecting inconsistency of a state where the state of the secondary cell managed by the secondary cell state management circuitry is the deactivation state and a state of the secondary cell managed by a base station is the activation state; and
   transmitting a notification to the base station that the state of the secondary cell is the deactivation state, when the inconsistency of the state of the secondary cell is detected.

7. A mobile station for communication using carrier aggregation, comprising:
   a reception circuitry configured to receive an instruction from a base station to transition a secondary cell to a deactivation state; and
   a transition instruction control circuitry configured to discard the instruction received by the reception circuitry, when, the instruction received by the reception circuitry is an instruction for a secondary cell in which transmission of a physical uplink control channel is supported.

8. The mobile station as claimed in claim 7, wherein the transition instruction control circuitry keeps the secondary cell in an activation state when a timer expires, the timer being set to transition the secondary cell in which transmission of the physical uplink control channel is supported to the deactivation state.

9. A control method in a mobile station for communication using carrier aggregation, comprising the steps of:
   receiving an instruction from a base station to transition a secondary cell to a deactivation state; and
   discarding the received instruction, when the received instruction is an instruction for a secondary cell in which transmission of a physical uplink control channel is supported.

* * * * *